United States Patent
Hamamura et al.

(10) Patent No.: US 8,264,472 B2
(45) Date of Patent: Sep. 11, 2012

(54) STORAGE MEDIUM STORING INFORMATION PROCESSING PROGRAM AND INFORMATION PROCESSING APPARATUS

(75) Inventors: Takashi Hamamura, Osaka (JP); Kazunori Takahashi, Osaka (JP); Hiroyuki Hayashi, Tokyo (JP); Masanobu Yamamoto, Tokyo (JP)

(73) Assignees: Nintendo Co., Ltd., Kyoto (JP); Hal Laboratory Inc., Tokyo (JP)

( * ) Notice: Subject to any disclaimer, the term of this patent is extended or adjusted under 35 U.S.C. 154(b) by 551 days.

(21) Appl. No.: 12/572,682

(22) Filed: Oct. 2, 2009

(65) Prior Publication Data
US 2010/0315352 A1  Dec. 16, 2010

(30) Foreign Application Priority Data
Jun. 16, 2009  (JP) ................................ 2009-143330

(51) Int. Cl.
*G06F 3/041* (2006.01)
(52) U.S. Cl. ....................................... 345/173; 345/169
(58) Field of Classification Search .................. 345/173, 345/174, 175, 156, 157, 104; 175/700
See application file for complete search history.

(56) References Cited

U.S. PATENT DOCUMENTS

| | | | | |
|---|---|---|---|---|
| 7,546,602 | B2 * | 6/2009 | Hejlsberg et al. | 719/313 |
| 2007/0232388 | A1 * | 10/2007 | Sato | 463/25 |
| 2009/0002333 | A1 * | 1/2009 | Maxwell et al. | 345/173 |
| 2009/0024943 | A1 * | 1/2009 | Adler et al. | 715/764 |

FOREIGN PATENT DOCUMENTS
JP  2006-304855  11/2006

* cited by examiner

*Primary Examiner* — Ricardo L Osorio
(74) *Attorney, Agent, or Firm* — Nixon & Vanderhye P.C.

(57) ABSTRACT

A computer readable storage medium storing an information processing program causes a computer to function as display control means, coordinate detecting means, and object selecting means. The display control means displays on a display device at least a portion of a virtual world in which a plurality of objects are provided. The coordinate detecting means detects input coordinates input by the pointing device. The object selecting means, when the input coordinates indicate any of the plurality of objects, selects the indicated object as a target to be operated, and when the input coordinates indicate none of the plurality of objects, selects at least one object satisfying a predetermined condition of the plurality of objects as a target to be operated.

17 Claims, 19 Drawing Sheets

F I G. 2 3

| AVERAGE VALUE OF CHANGE AMOUNTS (DOTS) | MOVEMENT SPEED (DOTS/FRAME) |
|---|---|
| 1-2 | 9.10 |
| 3-5 | 11.80 |
| 6 OR MORE | 14.95 |

STORAGE MEDIUM STORING INFORMATION PROCESSING PROGRAM AND INFORMATION PROCESSING APPARATUS

CROSS REFERENCE TO RELATED APPLICATION

The disclosure of Japanese Patent Application No. 2009-143330, filed Jun. 16, 2009, is incorporated herein by reference.

BACKGROUND OF THE INVENTION

1. Field of the Invention

The present invention relates to a storage medium storing an information processing program and an information processing apparatus. More particularly, the present invention relates to a storage medium storing an information processing program and an information processing apparatus which are used to perform an operation to select one or more from a plurality of objects using a pointing device.

2. Description of the Background Art

Conventionally, there is a technique which requires different operations between when selecting only one from a plurality of objects and when selecting more than one from a plurality of objects. For example, Japanese Patent Laid-Open Publication No. 2006-304855 (hereinafter referred to as Patent Document 1) discloses a game apparatus in which different selection methods are used between when selecting only one character and when selecting a plurality of characters, in a virtual world in which a plurality of characters exist.

In the game apparatus disclosed in Patent Document 1, when a player desires to select a single player character which exists in a virtual space displayed on a screen, the player directly touches the player character using a pointing device. On the other hand, in the game apparatus, when the player desires to simultaneously select a plurality of player characters which exist in a virtual space displayed on a screen, the player performs a touch operation to enclose the player characters using a pointing device (e.g., a touch panel). Specifically, when the player performs the enclosing touch operation, a red line is drawn in a virtual space, depending on positions where the touch operation has been performed. Of a plurality of player characters which exist in a virtual space displayed on a screen, player characters enclosed with the red line are selected. Thereafter, the player can move the player characters enclosed with the red line by further performing a touch operation with respect to the player characters enclosed with the red line until the player ends the touch operation.

However, in the game apparatus disclosed in Patent Document 1, when the player desires to select a plurality of player characters, the player needs to perform a touch operation to enclose the player characters, which causes a select operation to be burdensome. Moreover, in the game apparatus disclosed in Patent Document 1, the player needs to select a plurality of player characters which the player desires to move before performing a move operation, such as a drag operation or the like, which causes the move operation to be complicated.

SUMMARY OF THE INVENTION

Therefore, an object of the present invention is to provide a storage medium storing an information processing program or an information processing apparatus which makes it possible to select a target to be operated (an object or objects to be operated), by a simple input operation.

The present invention has the following features to attain the object mentioned above. Note that reference numerals, additional descriptions and the like inside parentheses in this section indicate correspondence to embodiments described below for the sake of easy understanding, and do not limit the present invention.

A first aspect of the present invention is directed to a computer readable storage medium storing an information processing program executable by a computer of an apparatus for selecting at least one object, depending on an output from a pointing device. The information processing program causes the computer to function as display control means, coordinate detecting means, and object selecting means. The display control means displays on a display device at least a portion of a virtual world in which a plurality of objects are provided. The coordinate detecting means detects input coordinates input by the pointing device. The object selecting means, when the input coordinates indicate any of the plurality of objects, selects the indicated object as a target to be operated, and when the input coordinates indicate none of the plurality of objects, selects at least one object satisfying a predetermined condition of the plurality of objects as a target to be operated. Note that the pointing device is an input device for designating an input position or coordinates on a screen, and is implemented using, for example, a touch panel, a mouse, a trackpad, a trackball, a graphics tablet, a joystick, a system for detecting a screen position pointed by a housing of a game controller, or the like.

Thus, a target to be operated can be selected by inputting using a simple pointing device.

Also, the object selecting means may select the object satisfying the predetermined condition as a target to be operated when the input coordinates indicate a position in the virtual world displayed on the display device and the input coordinates indicate none of the plurality of objects.

Thus, only by using the pointing device to designate a position in the virtual world displayed on the display device, an object satisfying a predetermined condition can be easily selected as a target to be operated.

Also, the plurality of objects may be each movable object which can be moved in the virtual world. In this case, the information processing program causes the computer to further function as object motion control means. The object motion control means causes the object which the object selecting means has selected as a target to be operated to perform a predetermined motion.

Thus, by simple inputting using the pointing device, a target to be operated can be selected, and in addition, the object can be caused to perform a predetermined motion.

Also, the movable object may be able to be moved in the virtual world, depending on an output from the pointing device. In this case, the object motion control means moves the object which the object selecting means has selected as a target to be operated in the virtual world, depending on an output from the pointing device.

Thus, by simple inputting using the pointing device, a target to be operated can be selected, and in addition, the object can be moved.

Also, the object motion control means may include first movement means and second movement means. The first movement means, when the object indicated by the input coordinates is selected as a target to be operated by the object selecting means, moves the object in a direction depending on a change in the input coordinates. The second movement means, when the object satisfying the predetermined condition is selected as a target to be operated by the object selecting means, moves the object toward a position which is based on the input coordinates.

Thus, by a simple input operation using the pointing device, a target to be operated can be selected, and in addition, the object can be moved in a desired direction or toward a desired position.

Also, the information processing program may cause the computer to further function as time measuring means. The time measuring means measures a time period from the start to the end of inputting using the pointing device. In this case, the first movement means, when the time period measured by the time measuring means is within a first time period, moves the object which the object selecting means has selected as a target to be operated.

Thus, when an operation is performed to drag a selected object within the first time period using the pointing device, the object can be moved. Therefore, by performing an operation as if a desired object were flicked (e.g., a "flick operation"), the object can be moved. Therefore, an intuitive movement operation can be performed.

Also, the information processing program may cause the computer to further function as parameter calculating means. The parameter calculating means calculates a parameter relating to a change in input coordinates using any of the input coordinates detected between the start and the end of inputting using the pointing device. In this case, the first movement means, when the parameter satisfies a predetermined condition, moves the object which the object selecting means has selected as a target to be operated.

Thus, the selected object can be moved when an operation from the start to the end of inputting using the pointing device satisfies the predetermined condition, thereby making it possible to prevent an erroneous operation from occurring due to shaking or the like during inputting.

Also, the parameter calculating means may calculate as the parameter a distance between a position indicated by the input coordinates detected during the start of inputting using the pointing device and a position indicated by the input coordinates detected during the end of inputting using the pointing device. In this case, the first movement means, when the distance is larger than or equal to a predetermined value, moves the object which the object selecting means has selected as a target to be operated.

Thus, the selected object can be moved when an operation of dragging the pointing device by a predetermined distance or more, thereby making it possible to prevent an erroneous operation from occurring due to shaking or the like during inputting.

Also, the information processing program may cause the computer to further function as parameter calculating means and movement speed deciding means. The parameter calculating means calculates a parameter relating to a change in input coordinates using any of the input coordinates detected between the start and the end of inputting using the pointing device. The movement speed deciding means decides a movement speed of the object which the object selecting means has selected as a target to be operated, based on the parameter. In this case, the first movement means moves the object which the object selecting means has selected as a target to be operated, based on the movement speed decided by the movement speed deciding means.

Thus, the movement speed of the selected object is decided by an operation from the start to the end of inputting using the pointing device, thereby making it possible for the player to freely control the movement speed of the object.

Also, the parameter calculating means may include change amount calculating means and average value calculating means. The change amount calculating means repeatedly calculates a change amount between input coordinates detected in a current process by the coordinate detecting means and input coordinates detected in a previous process by the coordinate detecting means. The average value calculating means calculates as the parameter an average value of the change amounts repeatedly calculated by the change amount calculating means from the start to the end of inputting using the pointing device. In this case, the movement speed deciding means decides a movement speed of the object which the object selecting means has selected as a target to be operated, based on the average value.

Thus, the movement speed of the selected object is decided based on an operation speed during an operation of dragging the pointing device, thereby making it possible for the player to freely control the movement speed of the object.

Also, the information processing program may cause the computer to further function as time measuring means. The time measuring means measures a time period during which inputting using the pointing device has been continued since the start thereof. In this case, the second movement means, when the time period measured by the time measuring means is larger than or equal to a second time period, moves the object satisfying the predetermined condition toward the position which is based on the input coordinates.

Thus, it is necessary to perform continuous inputting using the pointing device during the second time period or longer, thereby making it possible to prevent an erroneous operation.

Also, the information processing program may cause the computer to further function as input determining means. The input determining means determines whether or not inputting using the pointing device is ended within a third time period after the object selecting means selects the object satisfying the predetermined condition as a target to be operated, and inputting using the pointing device is intermittently performed at least once within a fourth time period. In this case, the second movement means, when the time period measured by the time measuring means is larger than or equal to the second time period, moves the object satisfying the predetermined condition toward the position which is based on the input coordinates, at a first movement speed. Also, the second movement means, when the determination by the input determining means is positive, moves the object satisfying the predetermined condition toward the position which is based on the input coordinates, at a second movement speed different from the first movement speed. Note that the second, third and fourth time periods may be different from each other or at least two of them may be the same as each other.

Thus, the selected object can be moved at different speeds by an operation of double-touching or double-clicking the pointing device and an operation of inputting during the second time period or longer, thereby making it possible to provide a variety of movements.

Also, the information processing program causes the computer to further function as input determining means. The input determining means determines whether or not inputting using the pointing device is ended within a third time period after the object selecting means selects the object satisfying the predetermined condition as a target to be operated, and inputting using the pointing device is intermittently performed at least once within a fourth time period. In this case, the second movement means, when the determination by the input determining means is positive, moves the object satisfying the predetermined condition toward the position based on the input coordinates only within a fifth time period. Note that the third, fourth and fifth time periods may be different from each other or at least two of them may be the same as each other.

Thus, even after inputting using the pointing device is ended, the selected object can be moved toward a position which is based on input coordinates only within a predetermined time period (fifth time period).

Also, the object selecting means, when the input coordinates indicate none of the plurality of objects, may select all objects provided in the virtual world as a target to be operated.

Thus, by a simple input operation using the pointing device, all objects provided in the virtual world can be selected as a target to be operated, and an object provided in the virtual world outside a display region of the display device can be selected.

Also, the object selecting means, when the input coordinates indicate none of the plurality of objects, may select at least one object displayed on the display device as a target to be operated.

Thus, by a simple input operation using the pointing device, all objects provided in the virtual world can be selected as a target to be operated.

Also, the object selecting means, when the input coordinates indicate none of the plurality of objects, may select as a target to be operated at least one object located within a predetermined range which is based on a position in the virtual world indicated by the input coordinates.

Thus, by a simple input operation using the pointing device, an object provided within the predetermined range which is based on input coordinates can be selected as a target to be operated.

Note that the first to fifth time periods may be different from each other or at least two of them may be the same as each other.

A second aspect of the present invention is directed to an information processing apparatus includes the means described above.

According to the present invention, a target to be operated can be selected by a simple input operation using a pointing device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 21 is a diagram of a subroutine showing an exemplary detailed operation of a gathering process performed in step 66 of FIG. 15 and the like;

FIG. 23 is a diagram showing an exemplary data table used in step 96 of FIG. 17.

DESCRIPTION OF THE PREFERRED EMBODIMENTS

Figure 1:
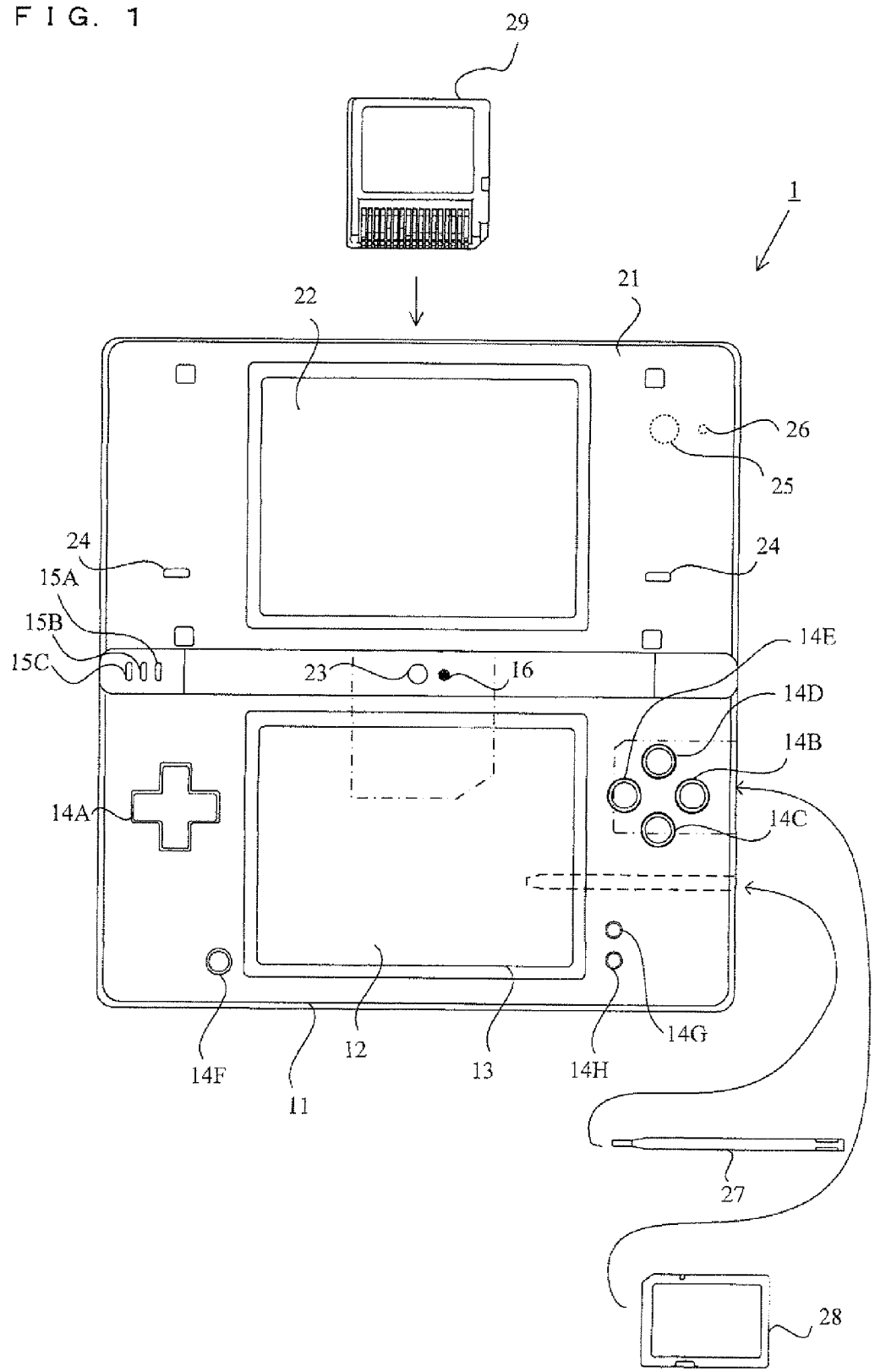
FIG. 1 is an external view of a game apparatus 1 which executes a game program which is an information processing program according to an embodiment of the present invention.

An information processing apparatus for executing an information processing program according to an embodiment of the present invention will be described with reference to the accompanying drawings. The information processing program of the present invention can be applied and executed by any computer system. As an example of the information processing apparatus, a game apparatus 1 is used. The information processing program of the present invention will be described using an information processing program which is executed by the game apparatus 1. Note that FIG. 1 is an external view of the game apparatus 1 which executes a game program which is an example of the information processing program of the present invention. Here, as an example of the game apparatus 1, a handheld game apparatus will be described. Note that the game apparatus 1 includes a camera, i.e., also functions as an imaging apparatus which captures an image using the camera, displays the captured image on a screen, or saves data of the captured image.

In FIG. 1, the game apparatus 1, which is a flip-type handheld game apparatus, is shown in an open state. The game apparatus 1 has a size which allows the player to hold it by one or both hands, even when it is in the open state.

The game apparatus 1 has a lower housing 11 and an upper housing 21. The lower housing 11 and the upper housing 21 are linked to each other in a manner which allows them to be opened and closed (foldable). In the example of FIG. 1, the lower housing 11 and the upper housing 21 are each in the shape of a rectangular board which is wider than it is tall, and are rotatably linked at their longer sides. Typically, the player uses the game apparatus 1 in the open state. When the game apparatus 1 is not used, the player leaves the game apparatus 1 in the closed state. Also, in the example of FIG. 1, the game apparatus 1 is not limited to the open and closed states, and can be maintained with the lower housing 11 and the upper housing 21 being in an intermediate state between the open state and the closed state, keeping any angle by friction force occurring at the linking portion. In other words, the upper housing 21 can be caused to remain still at any angle with respect to the lower housing 11.

The lower housing 11 includes a lower LCD (Liquid Crystal Display) 12. The lower LCD 12 is wider than it is tall, and is arranged in a manner which causes a longer side direction thereof matches a longer side direction of the lower housing 11. Although an LCD is employed as the display device included in the game apparatus 1 in this embodiment, any other display devices may be used, including a display device in which EL (Electro Luminescence: electric field light emission) is utilized, and the like. The game apparatus 1 can also employ a display device having any resolution.

Operation buttons 14A to 14K and a touch panel 13 are provided as input devices in the lower housing 11. As shown in FIG. 1, of the operation buttons 14A to 14K, a direction input button 14A, an operation button 14B, an operation button 14C, an operation button 14D, an operation button 14E, a power button 14F, a start button 14G, and a select button 14H, are provided on an inner main surface of the lower housing 11 which is located inside the upper housing 21 and the lower housing 11 when the upper housing 21 and the lower housing 11 are closed. The direction input button 14A is used in, for example, a select operation or the like. The operation buttons 14B to 14E are used in, for example, a decide operation, a cancel operation and the like. The power button 14F is used to power ON/OFF the game apparatus 1. In the example of FIG. 1, the direction input button 14A and the power button 14F are provided on the inner main surface of the lower housing 11 on one (the left side in FIG. 1) of the right and left sides of the lower LCD 12 provided in the vicinity of a middle of the inner main surface of the lower housing 11. The operation buttons 14B to 14E, the start button 14G and the select button 14H are provided on the inner main surface of the lower housing 11 on the other side (the right side in FIG. 1) of the right and left sides of the lower LCD 12. The direction input button 14A, the operation buttons 14B to 14I, the start button 14G and the select button 14H are used to perform various operations with respect to the game apparatus 1.

Note that, in FIG. 1, the operation buttons 14I to 14K are not shown. For example, the L-button 14I is provided in a left end portion of an upper surface of the lower housing 11, and the R-button 14J is provided in a right end portion of the upper side surface of the lower housing 11. The L-button 14I and the R-button 14J are used to perform, for example, a shoot command operation (shutter release operation) with respect to the game apparatus 1. Moreover, the sound volume button 14K is provided in a left side surface of the lower housing 11. The sound volume button 14K is used to adjust the sound volume of a loudspeaker included in the game apparatus 1.

The game apparatus 1 also includes a touch panel 13 as an input device in addition to the operation buttons 14A to 14K. The touch panel 13 is attached to the lower LCD 12, covering a screen of the lower LCD 12. Note that, in this embodiment, the touch panel 13 is, for example, a resistive touch panel. Note that the touch panel 13 is not limited to the resistive type, and any pressure touch panels can be used. Also, in this embodiment, for example, the touch panel 13 has the same resolution (detection precision) as that of the lower LCD 12. Note that the resolution of the touch panel 13 does not necessarily need to be equal to the resolution of the lower LCD 12. Also, a slot (indicated by a dashed line in FIG. 1) for a touch stylus 27 is provided in a right side surface of the lower housing 11. The slot can accommodate the touch stylus 27 which is used to perform an operation with respect to the touch panel 13. Although the touch stylus 27 is normally used to enter an input to the touch panel 13, a finger of the player or the like as well as the touch stylus 27 can be used to operate the touch panel 13.

Also, a slot (indicated by a dash-dot-dot-dash line in FIG. 1) for accommodating a memory card 28 is provided in the right side surface of the lower housing 11. A connector (not shown) for electrically connecting the game apparatus 1 and the memory card 28 is provided inside the slot. The memory card 28, which is, for example, an SD (Secure Digital) memory card, is detachably attached to the connector. The memory card 28 is used to, for example, store (save) an image captured by the game apparatus 1, read an image generated by another device into the game apparatus 1, or the like.

Moreover, a slot (indicated by a dash-dot-dash line in FIG. 1) for accommodating a memory card 29 is provided in the upper side surface of the lower housing 11. Also inside the slot, a connector (not shown) for electrically connecting the game apparatus 1 and the memory card 29 is provided. The memory card 29, which is a storage medium which stores an information processing program, a game program or the like, is detachably attached to the slot provided in the lower housing 11.

Three LEDs 15A to 15C are attached to a left side portion of the linking portion of the lower housing 11 and the upper housing 21. Here, the game apparatus 1 can wirelessly communicate with another apparatus. The first LED 15A is ON during a time period that wireless communication is established. The second LED 15B is ON during a time period that the game apparatus 1 is charged. The third LED 15C is ON during a time period that the game apparatus 1 is powered ON. Therefore, the three LEDs 15A to 15C can notify the player of the communication establishment status, the charging status and the power ON/OFF status of the game apparatus 1.

On the other hand, the upper housing 21 includes an upper LCD 22. The upper LCD 22 is wider than it is tall, and is arranged in a manner which allows a longer side direction thereof matches a longer side direction of the upper housing 21. Note that, as is similar to the lower LCD 12, a display device having any other technology and any other resolution may be employed instead of the upper LCD 22. Moreover, a touch panel may be provided, covering the upper LCD 22.

Moreover, two camera an inner camera 23 and an outer camera 25) are provided in the upper housing 21. As shown in FIG. 1, the inner camera 23 is attached to the inner main surface in the vicinity of the linking portion of the upper housing 21. On the other hand, the outer camera 25 is attached to a surface opposite to the inner main surface to which the inner camera 23 is attached, i.e., an outer main surface of the upper housing 21 (a back surface of the upper housing 21 shown in FIG. 1, which is located outside when the game apparatus 1 is in the closed state). Note that, in FIG. 1, the outer camera 25 is indicated by a dashed line. As a result, the inner camera 23 can capture an image in a direction in which the inner main surface of the upper housing 21 faces, and the outer camera 25 can capture an image in a direction opposite to the shooting direction of the inner camera 23, i.e., a direction in which the outer main surface of the upper housing 21 faces. Thus, in this embodiment, the two cameras, i.e, the inner camera 23 and the outer camera 25, are arranged in a manner which allows their shooting directions to be opposite to each other. For example, while the player can capture an image of a scene as viewed from the game apparatus 1 toward the player using the inner camera 23, and the outer camera 25 can capture an image of a scene as viewed from the game apparatus 1 in a direction opposite to the direction toward the player. Note that the lower LCD 12 and/or the upper LCD 22 may also be used to display an image captured by the inner camera 23 or the outer camera 25 in real time.

Note that a microphone (a microphone 43 shown in FIG. 2) is accommodated as a voice input device in the inner main surface in the vicinity of the linking portion. In addition, a microphone hole 16 which allows the microphone 43 to sense a sound outside the game apparatus 1, is formed in the inner main surface in the vicinity of the linking portion. The position where the microphone 43 is accommodated and the position of the microphone hole 16 do not necessarily need to be located at the linking portion. Alternatively, for example, the microphone 43 may be accommodated in the lower housing 11 while the microphone hole 16 may be provided in the lower housing 11, corresponding to the position where the microphone 43 is accommodated.

Moreover, a fourth LED 26 (indicated by a dashed line in FIG. 1) is attached to the outer main surface of the upper housing 21. The fourth LED 26 is ON during a time period that the inner camera 23 or the outer camera 25 captures an image. The fourth LED 26 may also flicker during a time period that the inner camera 23 or the outer camera 25 captures a moving image (stores captured images as a moving image). Note that the fourth LED 26 may be OFF during a time from when the shutter release is pressed to when an image captured at the moment when the shutter release is pressed is completely stored, so as to prevent the LED to be reflected on the screen. The fourth LED 26 can be used to notify a subject or a person around that the game apparatus 1 is shooting the subject.

Moreover, sound holes 24 are formed in the main surface on both right and left sides of the upper LCD 22 provided in the vicinity of the middle of the inner main surface of the upper housing 21. Loudspeakers are accommodated in the upper housing 21 behind the respective sound holes 24. The sound holes 24 are used to emit sounds from the loudspeakers to the outside of the game apparatus 1.

As described above, the upper housing 21 includes the inner camera 23 and the outer camera 25 for capturing images, and the upper LCD 22 which is a means for displaying various images. On the other hand, the lower housing 11 includes input devices (the touch panel 13 and the buttons 14A to 14K) for entering operational inputs to the game apparatus 1, and the lower LCD 12 which is a means for displaying various images. The input devices are used in, for example, an application in which, when the game apparatus 1 is used, the player holding the lower housing 11 is allowed to enter inputs to the input devices while a captured image (an image captured by a camera) is displayed on the lower LCD 12 or the upper LCD 22.

Next, an internal configuration of the game apparatus 1 will be described with reference to FIG. 2. Note that FIG. 2 is a block diagram showing an example of the internal configuration of the game apparatus 1.

Figure 2:
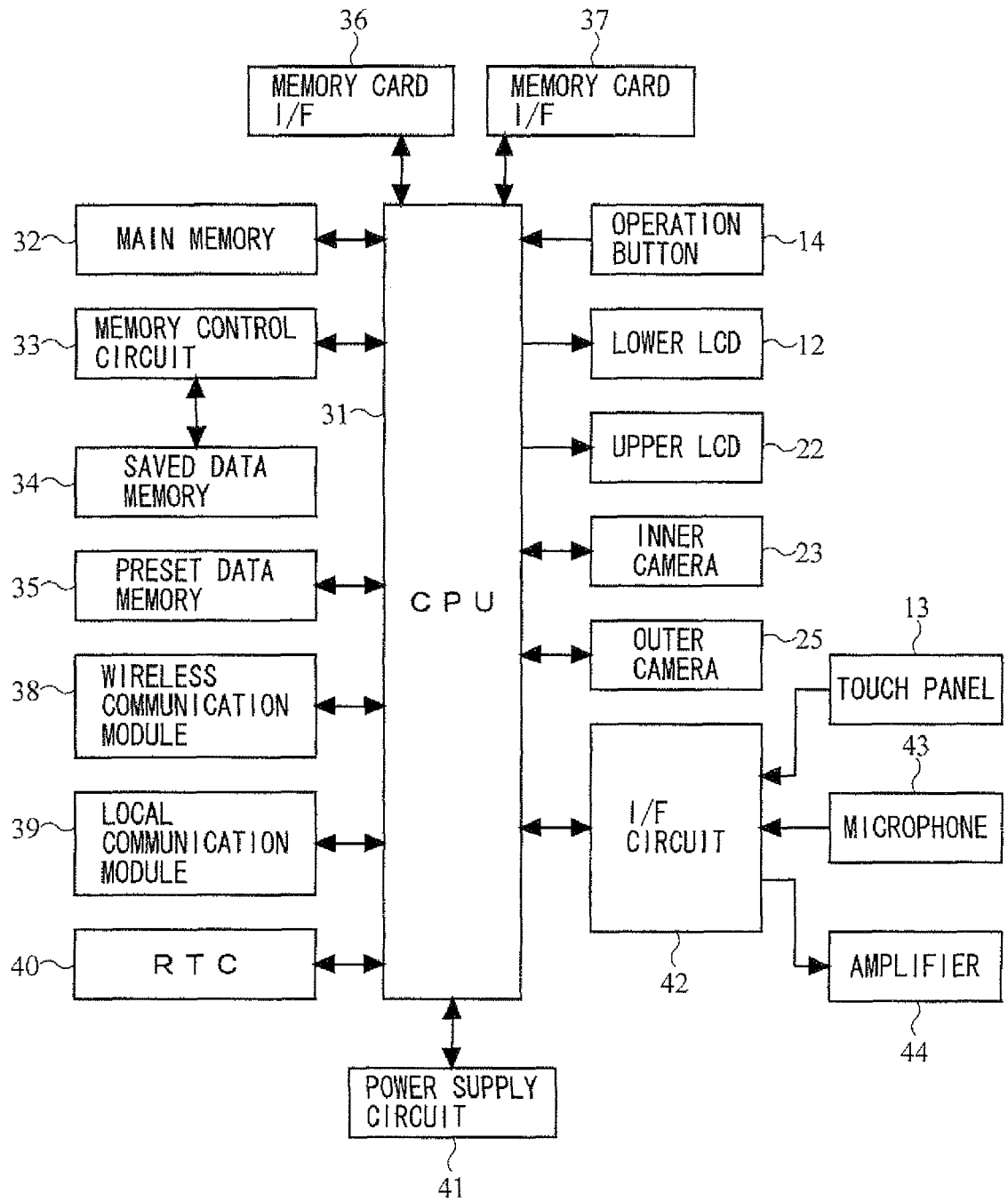
FIG. 2 is a block diagram showing an exemplary internal configuration of the game apparatus 1 of FIG. 1.

In FIG. 2, the game apparatus 1 includes electronic parts, such as a CPU 31, a main memory 32, a memory control circuit 33, a saved data memory 34, a preset data memory 35, memory card interfaces (memory card I/Fs) 36 and 37, a wireless communication module 38, a local communication module 39, a real-time clock (RTC) 40, a power supply circuit 41, an interface circuit (I/F circuit) 42 and the like. These electronic parts are mounted on an electronic circuit board, which is accommodated in the lower housing 11 (or the upper housing 21).

The CPU 31 is an information processing means for executing a predetermined program. In this embodiment, the predetermined program is stored in a memory (e.g., the saved data memory 34) provided in the game apparatus 1 or the memory cards and/or 29. The CPU 31 executes an information process described below by executing the predetermined program. Note that the program to be executed by the CPU 31 may be previously stored in the memory provided in the game apparatus 1 or may be obtained from the memory cards 28 and/or 29, or alternatively, may be obtained from another apparatus by communication with the apparatus.

The main memory 32, the memory control circuit 33 and the preset data memory 35 are connected to the CPU 31. Also, the saved data memory 34 is connected to the memory control circuit 33. The main memory 32 is a storage means which is used as a work area or a buffer area for the CPU 31. Specifically, the main memory 32 stores various pieces of data which are used in the information process, or a program obtained from the outside (the memory cards 28 and 29 or other apparatuses, etc.). In this embodiment, for example, a PSRAM (Pseudo-SRAM) is employed as the main memory 32. The saved data memory 34 is a storage means for storing a program to be executed by the CPU 31, data of images captured by the inner camera 23 and the outer camera 25, and the like. The saved data memory 34 includes a non-volatile storage medium (e.g., a NAND flash memory in this example). The memory control circuit 33 controls a read operation and a write operation of data with respect to the saved data memory 34 in accordance with a command from the CPU 31. The preset data memory 35 is a storage means for storing data (preset data), such as various parameters previously set in the game apparatus 1 or the like. The preset data memory 35 can be a flash memory which is connected to the CPU 31 via an SPI (Serial Peripheral Interface) bus.

The memory card I/Fs 36 and 37 are each connected to the CPU 31. The memory card I/F 36 performs a read operation and a write operation of data with respect to the memory card 28 attached to the connector in accordance with a command from the CPU 31. Also, the memory card I/F 37 performs a read operation and a write operation of data with respect to the memory card 29 attached to the connector in accordance with a command from the CPU 31. In this embodiment, for example, various programs stored in the memory card 29 are read out and executed by the CPU 31

Note that the information processing program (game program) of the present invention is supplied to the computer system not only via the memory card 29, but also via an external storage medium, such as the memory card 28 or the like. Also, the information processing program of the present invention may be supplied to the computer system via a wired or wireless communication line. Moreover, the information processing program of the present invention may be previously stored in a non-volatile storage device provided in the computer system. Note that an information storing medium storing the information processing program of the present invention is not limited to the aforementioned non-volatile storage device, and may be a CD-ROM, a DVD, or other optical disc-shaped media similar to these.

The wireless communication module 38 has a function of connecting to a wireless LAN using a method conforming to, for example, the IEEE 802.11.b/g standard. Also, the local communication module 39 has a function of performing wireless communication with a game apparatus of the same type using a predetermined communication method. The wireless communication module 38 and the local communication module 39 are connected to the CPU 31. The CPU 31 can transmit and receive data to and from another apparatus via the Internet using the wireless communication module 38, and can transmit and receive data to and from another game apparatus of the same type using the local communication module 39.

Also, the RTC 40 and the power supply circuit 41 are connected to the CPU 31. The RTC 40 measures a time period by counting clocks and outputs the time period to the CPU 31. For example, the CPU 31 can also calculate a current time (date) or the like based on the time period measured by the RTC 40. The power supply circuit 41 controls power supplied from a power supply (typically, a battery, accommodated in the lower housing 11) possessed by the game apparatus 1, and supplies the power to each part of the game apparatus 1.

The game apparatus 1 also includes the microphone 43 and an amplifier 44. The microphone 43 and the amplifier 44 are connected to the I/F circuit 42. The microphone 43 senses a voice which the player utters toward the game apparatus 1, and outputs an audio signal indicating the voice to the I/F circuit 42. The amplifier 44 amplifies the audio signal from the I/F circuit 42 and outputs the resultant signal through the loudspeakers (not shown). The I/F circuit 42 is connected to the CPU 31.

Also, the touch panel 13 is connected to the I/F circuit 42. The I/F circuit 42 includes an audio control circuit which controls the microphone 43 and the amplifier 44 (loudspeakers), and a touch panel control circuit which controls the touch panel 13. The audio control circuit performs A/D conversion and D/A conversion with respect to an audio signal, or converts an audio signal into audio data in a predetermined format. The touch panel control circuit generates touch position data in a predetermined format based on a signal from the touch panel 13, and outputs the touch position data to the CPU 31. For example, the touch position data is data which indicates coordinates of a position where an input is entered to an input surface of the touch panel 13. Note that the touch panel control circuit performs reading of a signal from the touch panel 13 and generation of the touch position data once per predetermined time period. The CPU 31 obtains the touch position data via the I/F circuit 42 to find out a position where an input is entered to the touch panel 13.

An operation button 14 includes the operation buttons 14A to 14K, and is connected to the CPU 31. The operation button 14 outputs to the CPU 31 operation data indicating an input status of each of the operation buttons 14A to 14K (whether or not each button has been pressed). The CPU 31 obtains operation data from the operation button 14 and executes a process corresponding to an input which has been entered to the operation button 14.

The inner camera 23 and the outer camera 25 are each connected to the CPU 31. The inner camera 23 and the outer camera 25 capture images in accordance with a command from the CPU 31, and output captured image data to the CPU 31. For example, the CPU 31 instructs one of the inner camera 23 and the outer camera 25 to capture an image, and the instructed camera captures an image and transmits image data to the CPU 31.

Also, the lower LCD 12 and the upper LCD 22 are each connected to the CPU 31. The lower LCD 12 and the upper LCD 22 each display an image in accordance with a command from the CPU 31. As an example, the CPU 31 causes the lower LCD 12 and/or the upper LCD 22 to display an image (e.g., a game image) generated by executing the game program. As another example, the CPU 31 causes one of the lower LCD 12 and the upper LCD 22 to display an image obtained from one of the inner camera 23 and the outer camera 25, and causes the other of the lower LCD 12 and the upper LCD 22 to display an operation explaining screen generated by a predetermined process.

Figure 3:
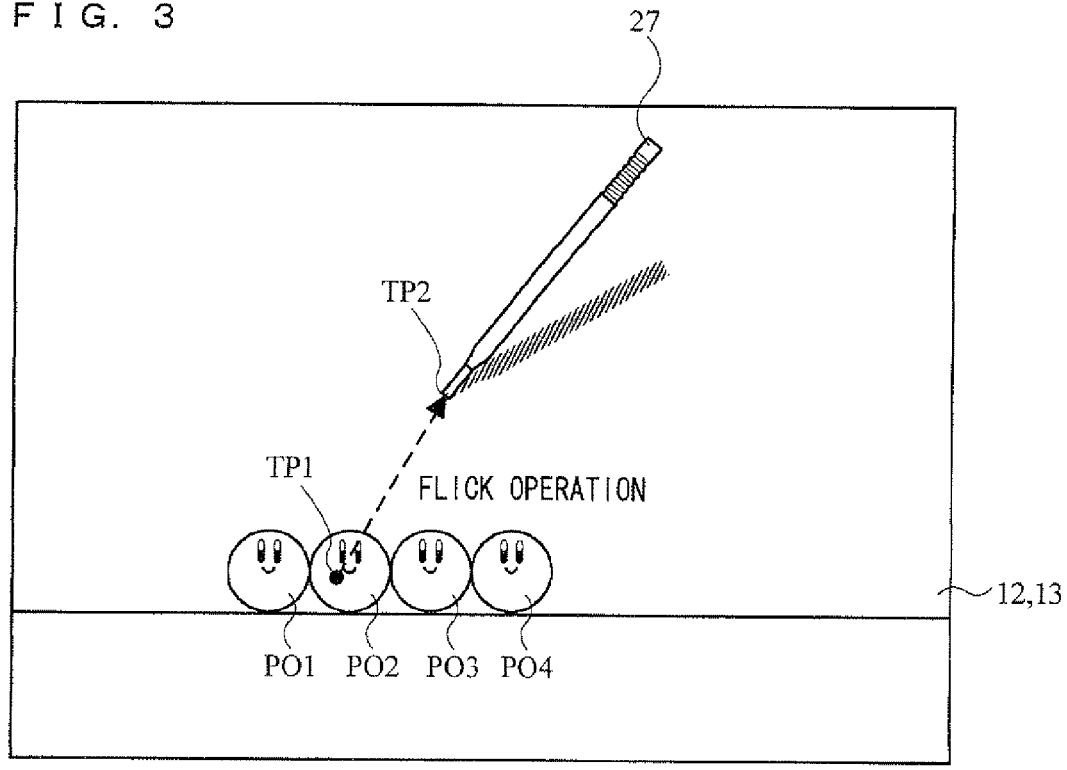
FIG. 3 is a diagram showing an exemplary game image displayed on a lower LCD 12 when a single operation object is selected as an object to be moved by performing a "flick operation" via a touch panel 13.
Figure 4:
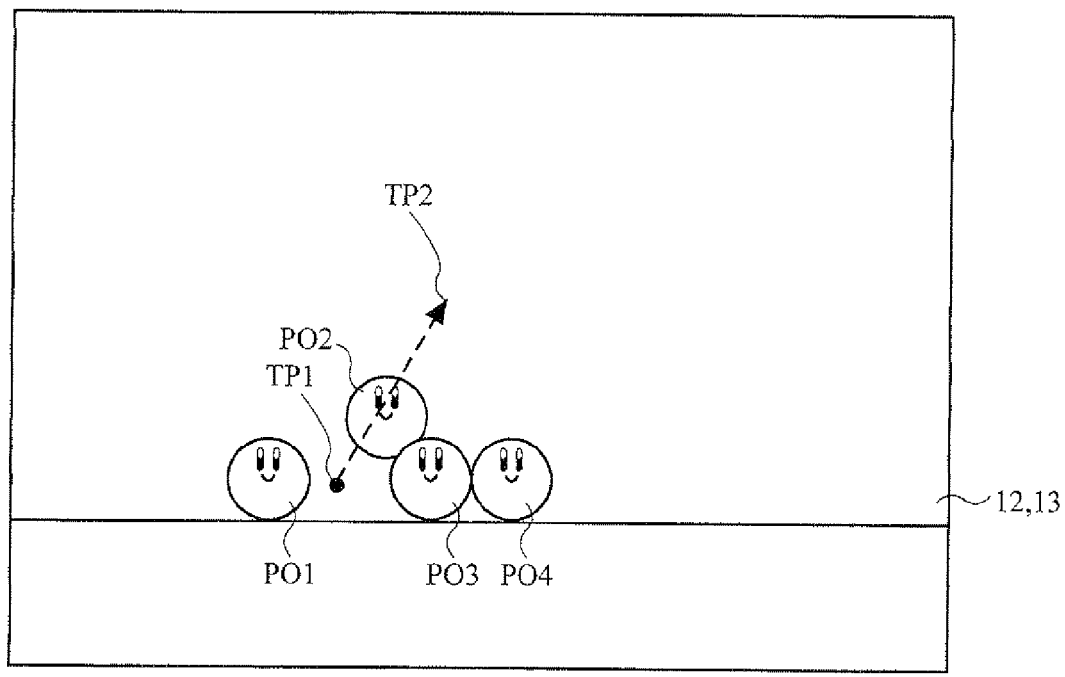
FIG. 4 is a diagram showing an exemplary game image displayed on the lower LCD 12 when a single operation object is selected as an object to be moved by performing a "flick operation" via the touch panel 13.
Figure 5:
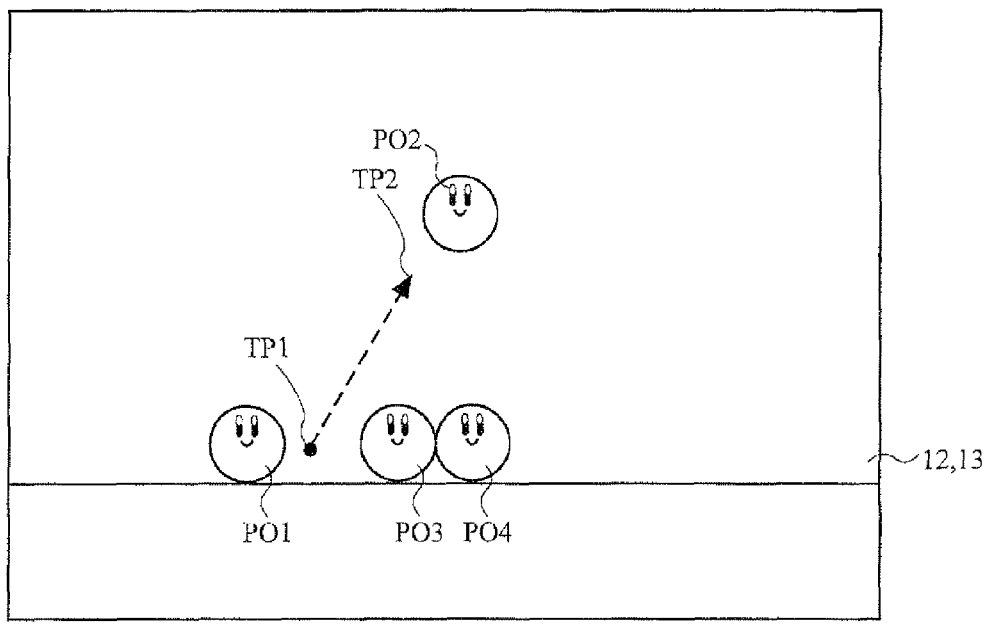
FIG. 5 is a diagram showing an exemplary game image displayed on the lower LCD 12 when a single operation object is selected as an object to be moved by performing a "flick operation" via the touch panel 13.

Next, before describing a specific process operation of a game program executed by the game apparatus 1, exemplary images displayed on the lower LCD 12 by the game process operation and the like will be described with reference to FIGS. 3 to 13. Note that FIGS. 3 to 5 are diagrams showing exemplary game images displayed on the lower LCD 12 when a single operation object is selected as an object to be moved by performing a "flick operation" via the touch panel 13. FIGS. 6 to 9 are diagrams showing exemplary game images displayed on the lower LCD 12 when a plurality of operation objects are selected as objects to be moved by performing a "continuous touch operation" via the touch panel 13. FIGS. 10 to 13 are diagrams showing exemplary game images displayed on the lower LCD 12 when a plurality of operation objects are selected as objects to be moved by performing a "double touch operation" via the touch panel 13.

In FIGS. 3 to 13, the lower LCD 12 displays a plurality of player objects PO which are arranged in a virtual game world. Here, in a game process described below, there may be a plurality of player objects in the virtual game world which can be operated by the player. In this embodiment, these player objects are collectively referred to as player objects PO. Specifically, the lower LCD 12 shown in FIGS. 3 to 13 displays four player objects PO1 to PO4, which are moved in the virtual game world, depending on a touch operation which is performed via the touch panel 13 by the player operating the game apparatus 1. Note that, when the virtual game world is set to be larger than a display range which is displayed on the lower LCD 12, a player object PO which can be operated by the player may be located within the virtual game world outside the display range.

In FIG. 3, the player uses the touch stylus 27 to perform a "flick operation" with respect to the touch panel 13 for one of the four player objects PO1 to PO4 (the player object PO2 in the example of FIG. 3). Here, the "flick operation" refers to a touch operation which flicks a player object PO which the player desires to move via the touch panel 13. In this embodiment, the player starts a touch operation (start-of-touch) with respect to the touch panel 13 at a position on a player object PO which the player desires to move, slides the touch stylus 27 on the touch panel 13 from the start-of-touch position in a desired movement direction, and ends the touch operation (end-of-touch) with respect to the touch panel 13. If this series of touch operations which are performed as if the player flicked an object are completed within a predetermined time period, this series of touch operations is defined as a "flick operation." In the example of FIG. 3, in order to move the player object 202, the player starts touching the touch panel 13 at a position (touch position TP1) on the player object PO2, quickly slides the touch stylus 27 on the touch panel 13 from the start-of-touch position in an upper right direction (direction indicated by a dashed line with an arrow) in which the player desires to move the player object 2, and ends touching the player object PO2 (touch position TP2), which is a "flick operation."

When a "flick operation" as shown in FIG. 3 is performed, only the player object PO2 which is located at the start-of-touch position (touch position TP1), of the player objects PO1 to PO4 displayed on the lower LCD 12, starts moving in a direction toward the end-of-touch position (i.e., a direction from the touch position TP1 toward the touch position TP2) (see FIG. 4). Note that a movement speed in the virtual game world when the player object PO2 starts moving is decided, depending on, for example, an average value of change amounts of touch positions on which a touch operation is performed by the "flick operation," which will be described in detail below.

The subsequent movement speed and movement direction of the player object PO2, which is moved in the virtual game world by the "flick operation," are changed, depending on an environment set in the virtual game world (see FIG. 5). Specifically, an initial speed and a starting movement direction (firing direction) of a player object as an object to be moved, which are caused by the "flick operation," are decided by a touch input operation in the "flick operation," and the subsequent movement speed and movement direction are decided, taking into consideration an environment which is set in the virtual game world. For example, when a downward gravitational acceleration is set in the virtual game world, the movement speed and the movement direction of the player object PO2 are changed, depending on a physical law relating to the gravitational acceleration. Moreover, when the player object PO2 contacts another object (another character, a wall, a ceiling, a ground, etc.) provided in the virtual game world, the movement speed and the movement direction of the player object PO2 are changed (e.g., the movement is stopped, the player object PO2 is repelled, etc.), depending on a property of the object which the player object PO2 contacts.

Figure 6:
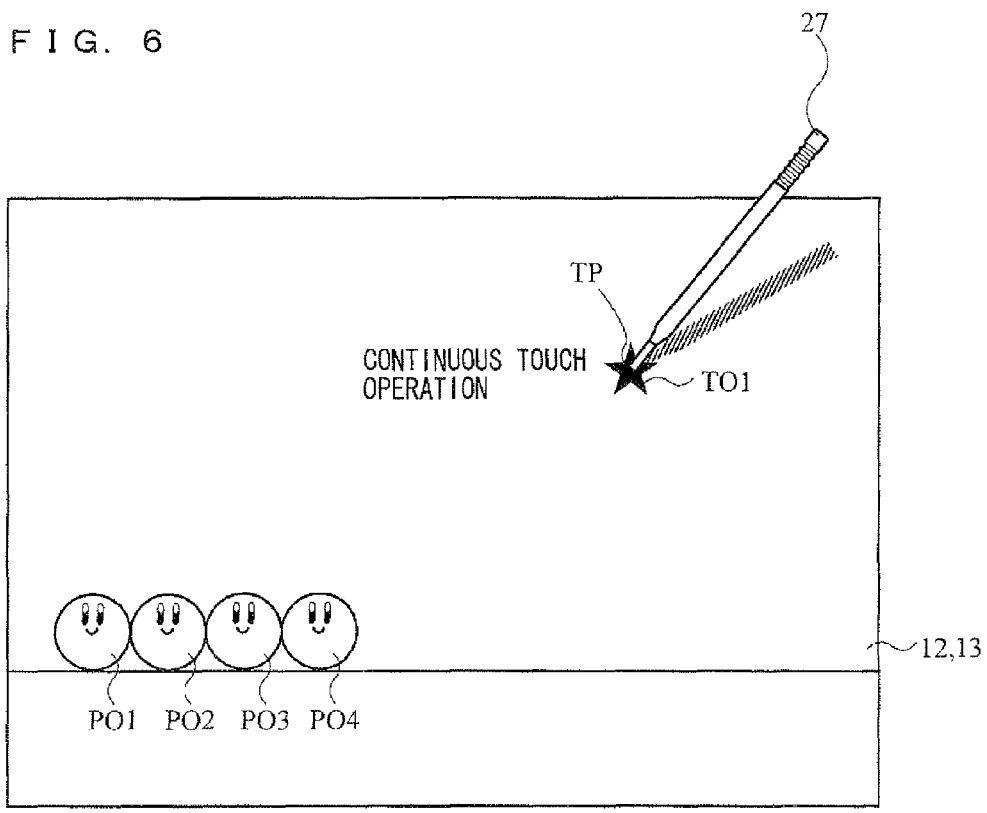
FIG. 6 is a diagram showing an exemplary game image displayed on the lower LCD 12 when a plurality of operation objects are selected as objects to be moved by performing a "continuous touch operation" via the touch panel 13.

In FIG. 6, the player uses the touch stylus 27 to perform a "continuous touch operation" with respect to the touch panel 13 for all of the four player objects PO1 to PO4. Here, the "continuous touch operation" refers to a touch operation in which the player continues to touch a position where the player desires to gather all the player objects PO, via the touch panel 13. In this embodiment, a touch operation in which the player continues to touch the touch panel 13 at a position in the virtual game world (except for the player object PO) to which the player desires to move the player object PO during a predetermined time period or more (i.e., a time period from a start-of-touch to an end-of-touch is larger than or equal to the predetermined time period), refers to a "continuous touch operation." In the example of FIG. 6, in order to gather all the player objects PO1 to 204, the player performs a "continuous touch operation" in which the player starts touching the touch panel 13 at a position (touch position TP) in the virtual game world where the player desires to gather all the player objects PO1 to PO4, and continues the touch operation at the start-of-touch position.

When a "continuous touch operation" as shown FIG. 6 is performed, a first gathering target object TO1 is displayed at a position in the virtual game world where the "continuous touch operation" is performed (typically, a position in the virtual game world overlapping a position where a touch operation is performed on the touch panel 13 in the "continuous touch operation"). Thereafter, all the player objects PO existing in the virtual game world (in the example of FIG. 6, the four player objects PO1 to 204) start moving toward the first gathering target object TO1 (i.e., the touch position TP) (see FIG. 7). Note that, if the player changes the touch position during the "continuous touch operation," a position where the first gathering target object TO1 is displayed is also changed, depending on the movement of the touch position, and a destination to which all the player objects PO are to be moved is also changed, depending on the change of the display position of the first gathering target object TO1. Also, when the player ends touching the touch panel 13 to end the "continuous touch operation," the first gathering target object TO1 also disappears immediately or after a time period (a delay).

Figure 7:
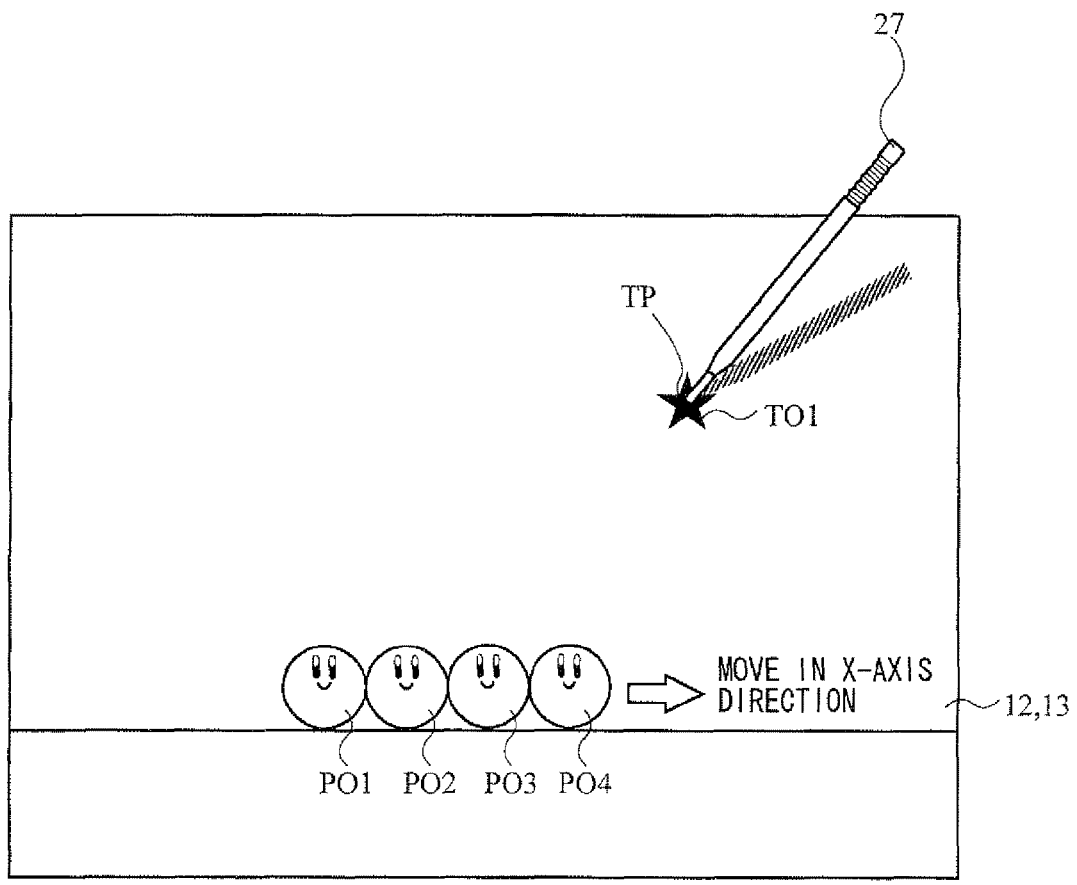
FIG. 7 is a diagram showing an exemplary game image displayed on the lower LCD 12 when a plurality of operation objects are selected as objects to be moved by performing a "continuous touch operation" via the touch panel 13.

In this embodiment, when all the player objects PO gather at the first gathering target object TO1, the player objects PO initially move in an X-axis direction (lateral direction of the screen) in the virtual game world so as to approach the first gathering target object TO1 (see FIG. 7). Thereafter, when the player objects PO have reached within a predetermined range with respect to a position in the X-axis direction of the first gathering target object TO1, the player objects PO move (jump) in a Y-axis direction (vertical direction of the screen) in the virtual game world so as to approach the first gathering target object TO1 (see FIG. 8). Thereafter, when the player objects PO have reached within a predetermined range with respect to the first gathering target object TO1, the player objects PO stick to the first gathering target object TO1 and stop moving in the virtual game world (see FIG. 9). By performing such movements, the player objects PO eventually gather at a position where the first gathering target object TO1 is provided (i.e., a position where the "continuous touch operation" has been performed). Thereafter, when the first gathering target object TO1 disappears (i.e., the player ends touching the touch panel 13 (end-of-touch) to end the "continuous touch operation"), the movement of the player objects PO toward the first gathering target object TO1 is also ended. Moreover, when the first gathering target object TO1 disappears, the player objects PO sticking to the first gathering target object TO1 perform an operation (e.g., a downward free fall in the virtual game world), depending on an environment set in the virtual game world.

Figure 10:
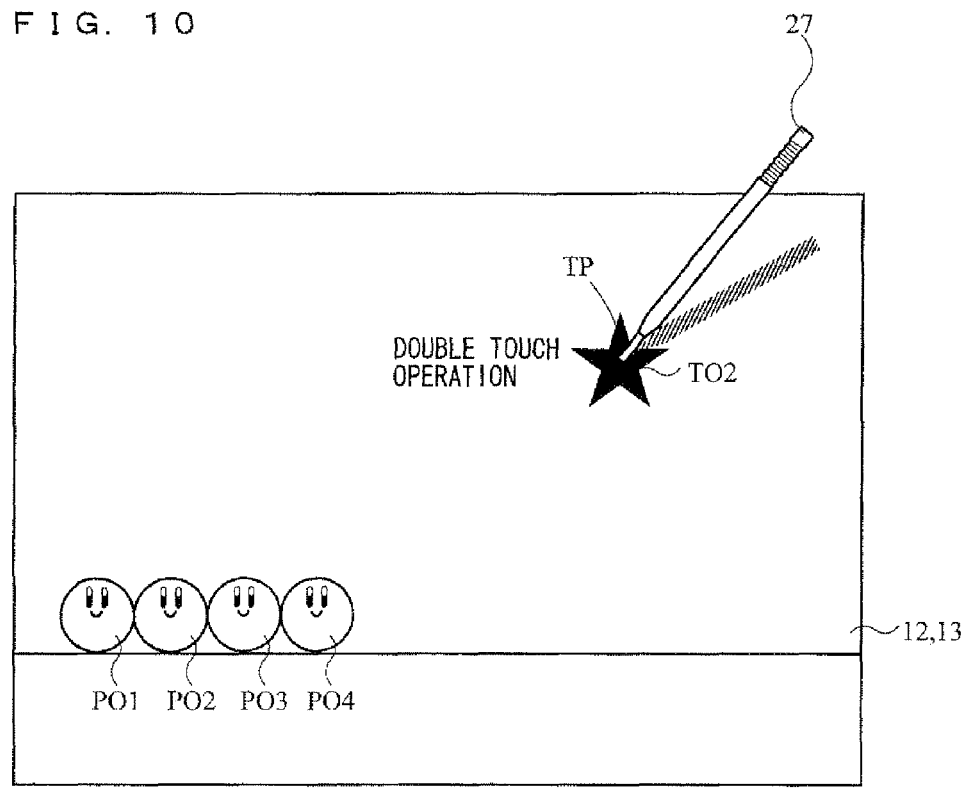
FIG. 10 is a diagram showing an exemplary game image displayed on the lower LCD 12 when a plurality of operation objects are selected as objects to be moved by performing a "double touch operation" via the touch panel 13.

In FIG. 10, the player uses the touch stylus 27 to perform a "double touch operation" with respect to the touch panel 13 for all the four player objects PO1 to 204. Here, the "double touch operation" refers to a touch operation in which the player performs an operation (tap operation) of starting touching a position where the player desires to gather all the player objects PO via the touch panel 13 and ending touching after a short time period, twice within a predetermined time period. In this embodiment, when the player performs the tap operation with respect to a position in the virtual game world (except for the player objects PO) to which the player desires to move the player objects PO, twice within a predetermined time period, the "double touch operation" is achieved. In the example of FIG. 10, the player performs the tap operation twice at a position (touch position TP) in the virtual game world where the player desires to gather all the player objects PO1 to PO4, which is the "double touch operation."

When a "double touch operation" as shown in FIG. 10 has been performed, a second gathering target object TO2 is displayed at a position in the virtual game world where the "double touch operation" has been performed (typically, a position in the virtual game world overlapping a position where a tap operation has been performed in the "double touch operation"). Thereafter, all player objects PO existing in the virtual game world (in the example of FIG. 10, the four player objects PO1 to PO4) start moving toward the second gathering target object TO2 (i.e., the touch position TP) (see FIG. 11). Note that, for example, the second gathering target object TO2 displayed in the virtual game world has a relatively large size so as to distinguish it from the displayed form of the first gathering target object TO1. Also, after the player performs the "double touch operation," the second gathering target object TO2 continues to be displayed in the virtual game world during a predetermined time period. Thereafter, the second gathering target object TO2 disappears from the virtual game world after the predetermined time period elapses.

Figure 11:
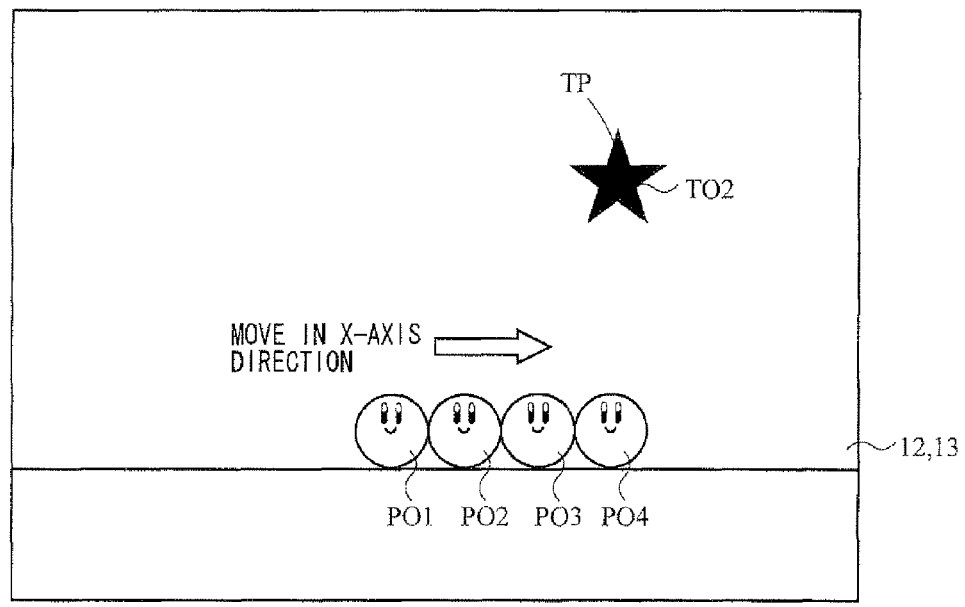
FIG. 11 is a diagram showing an exemplary game image displayed on the lower LCD 12 when a plurality of operation objects are selected as objects to be moved by performing a "double touch operation" via the touch panel 13.

In this embodiment, when all the player objects PO gather at the second gathering target object TO2, the player objects PO initially move in an X-axis direction (lateral direction of the screen) in the virtual game world so as to approach the second gathering target object TO2 (see FIG. 11). Here, a movement speed at which the player objects PO approach the second gathering target object 102 is set as higher than that at which the player objects PO approach the first gathering target object TO1. Thereafter, when the player objects PO have reached within a predetermined range with respect to a position in the X-axis direction of the second gathering target object 102, the player objects PO move (jump) in a Y-axis direction (vertical direction the screen) in the virtual game world so as to approach the second gathering target object TO2 (see FIG. 12). Thereafter, when the player objects PO have reached within a predetermined range with respect to the second gathering target object TO2, the player objects PO stick to the second gathering target object TO2 and stop moving in the virtual game world (see FIG. 13). By performing such movements, the player objects PO eventually gather at a position where the second gathering target object TO2 is provided (i.e., a position where the "double touch operation" has been performed). Thereafter, when the second gathering target object TO2 disappears (i.e., the predetermined time period elapses after the end of the "double touch operation"), the movement of the player objects PO toward the second gathering target object TO2 is also ended. Moreover, when the second gathering target object TO2 disappears, the player objects PO sticking to the second gathering target object TO2 perform an operation (e.g., a downward free fall in the virtual game world), depending on an environment set in the virtual game world.

Thus, as described above, both in the "continuous touch operation" and in the "double touch operation," all the player objects PO are gathered. However, the "double touch operation" has an advantage that the movement speed of the player objects PO is higher, and another advantage that the player objects PO can be gathered while the player is not performing a touch operation with respect to the touch panel 13. Thus, different forms can be selected so as to gather the player objects PO, and therefore, the player can select a desired touch operation, depending on a current operation state or game state.

Note that, in the description above, the movement speed of the player objects PO in the "double touch operation" is set as higher than that in the "continuous touch operation." Alternatively, the movement speed of the player objects PO in the "double touch operation" may be set as lower than that in the "continuous touch operation."

Figure 14:
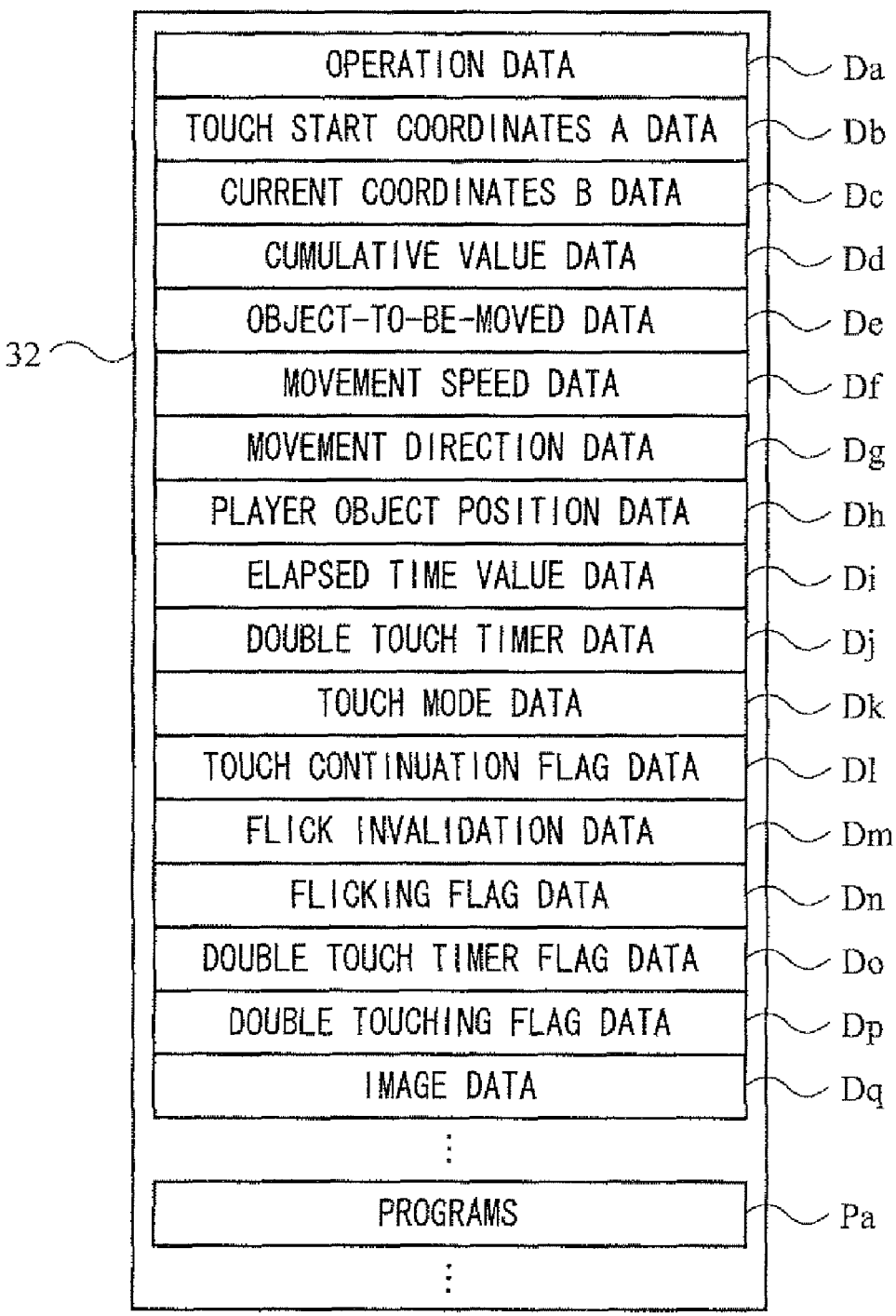
FIG. 14 is a diagram showing exemplary pieces of data which are stored in a main memory 32, depending on execution of a game program by the game apparatus 1 of FIG. 1.
Figure 15:
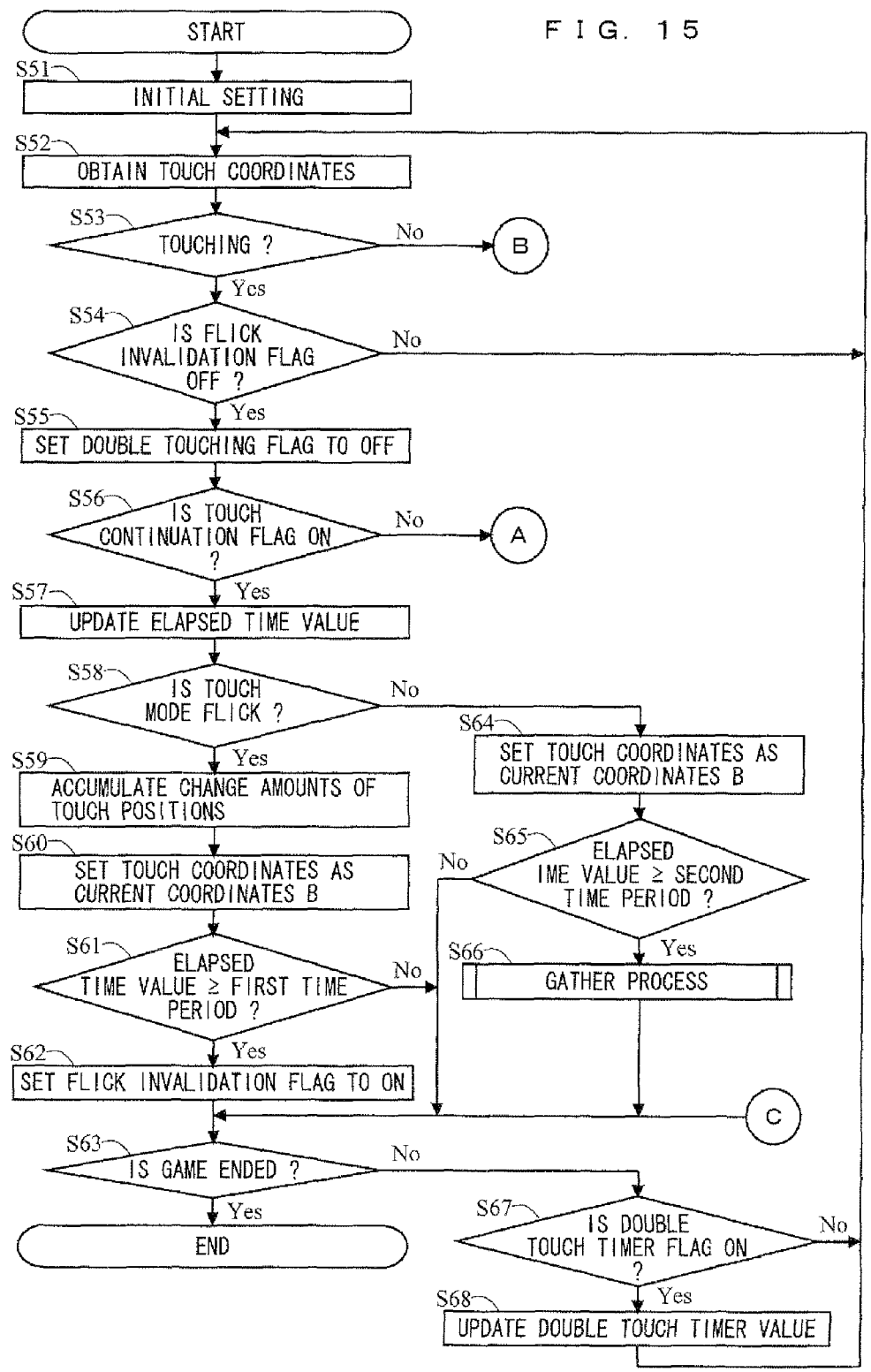
FIG. 15 is a flowchart of a first portion showing an exemplary operation of the game apparatus 1 performing a game process by executing the game program.
Figure 16:
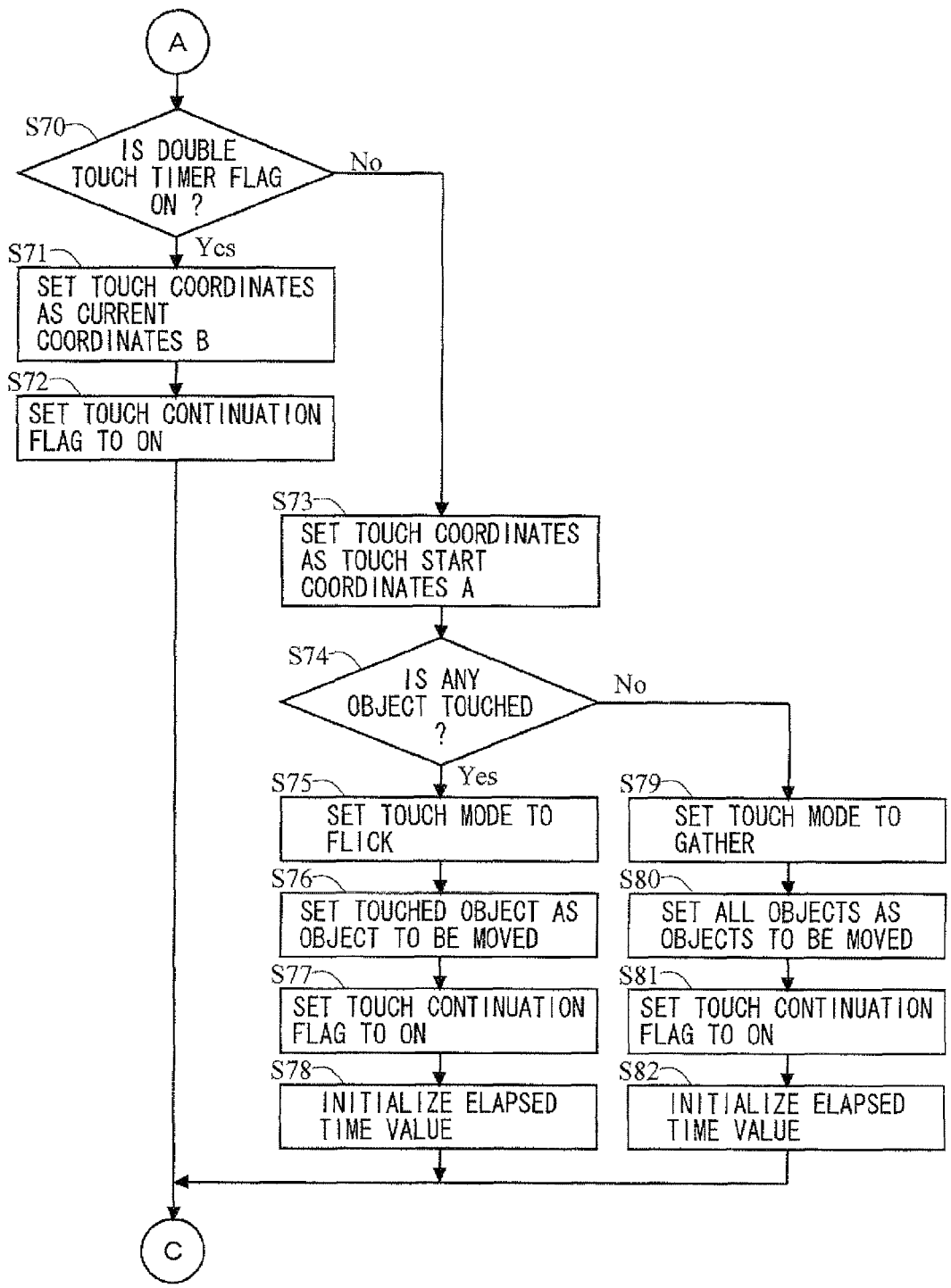
FIG. 16 is a flowchart of a second portion showing an exemplary operation of the game apparatus 1 performing a game process by executing the game program.
Figure 17:
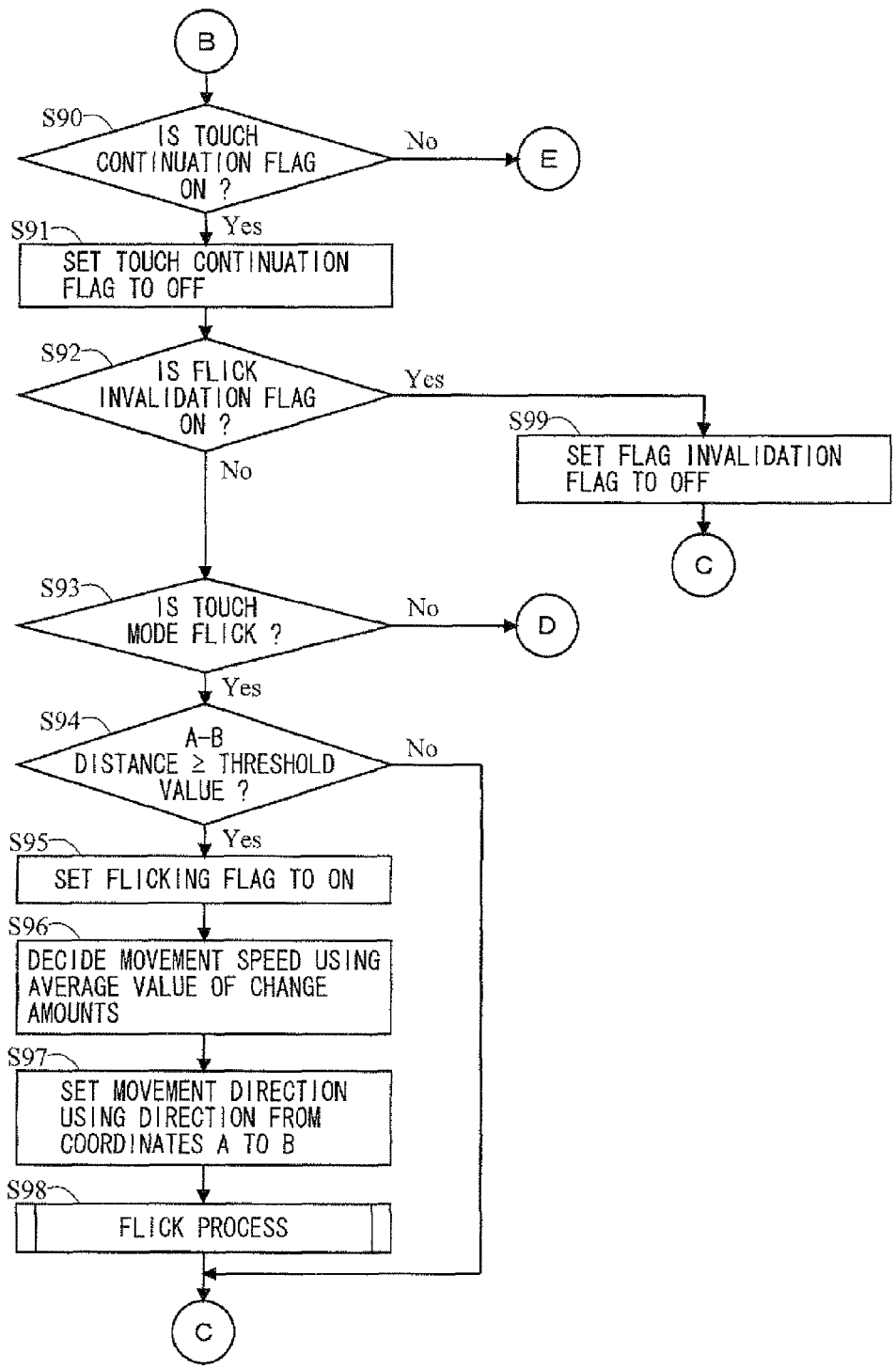
FIG. 17 is a flowchart of a third portion showing an exemplary operation of the game apparatus 1 performing a game process by executing the game program.
Figure 18:
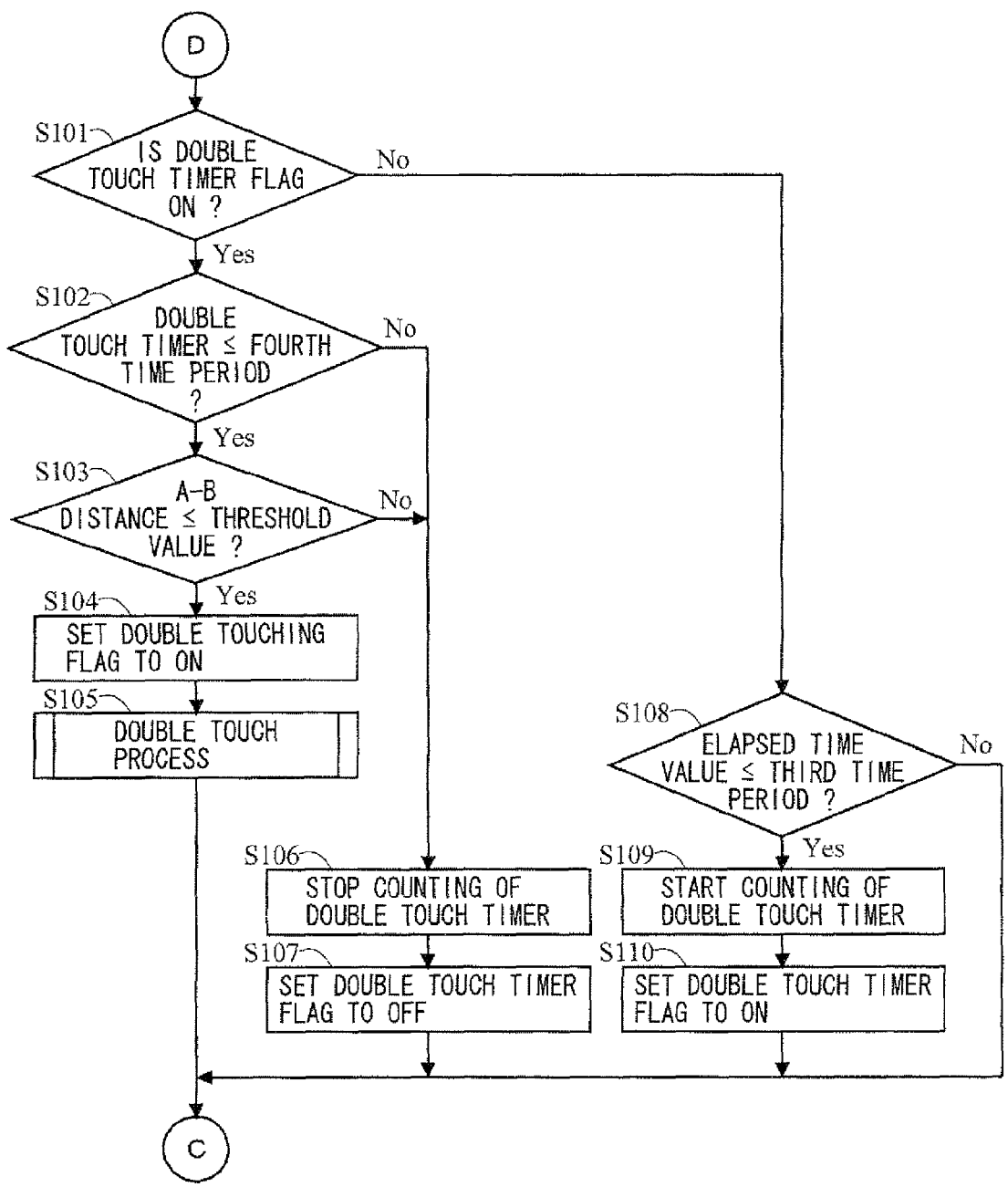
FIG. 18 is a flowchart of a fourth portion showing an exemplary operation of the game apparatus 1 performing a game process by executing the game program.
Figure 19:
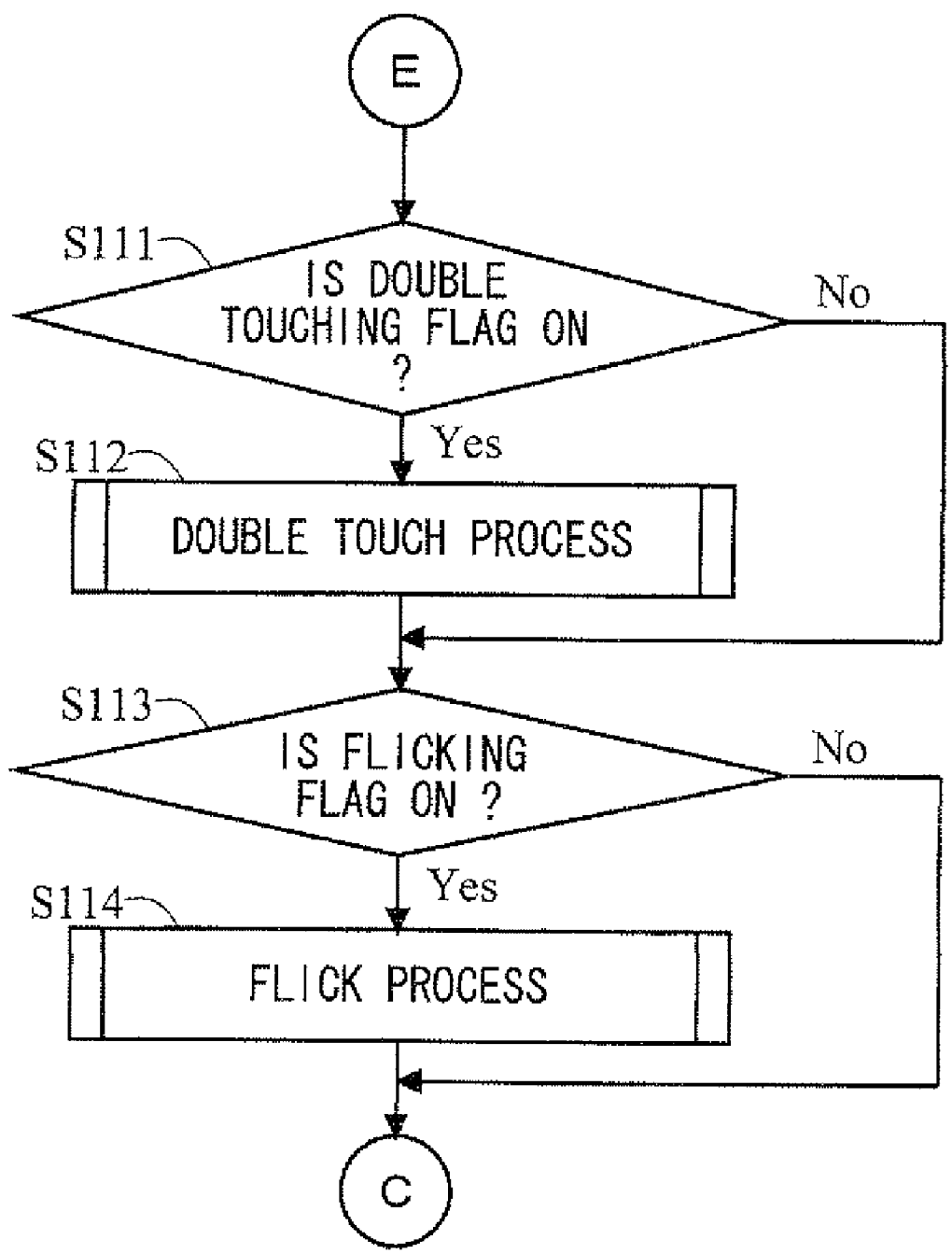
FIG. 19 is a flowchart of a fifth portion showing an exemplary operation of the game apparatus 1 performing a game process by executing the game program.
Figure 20:
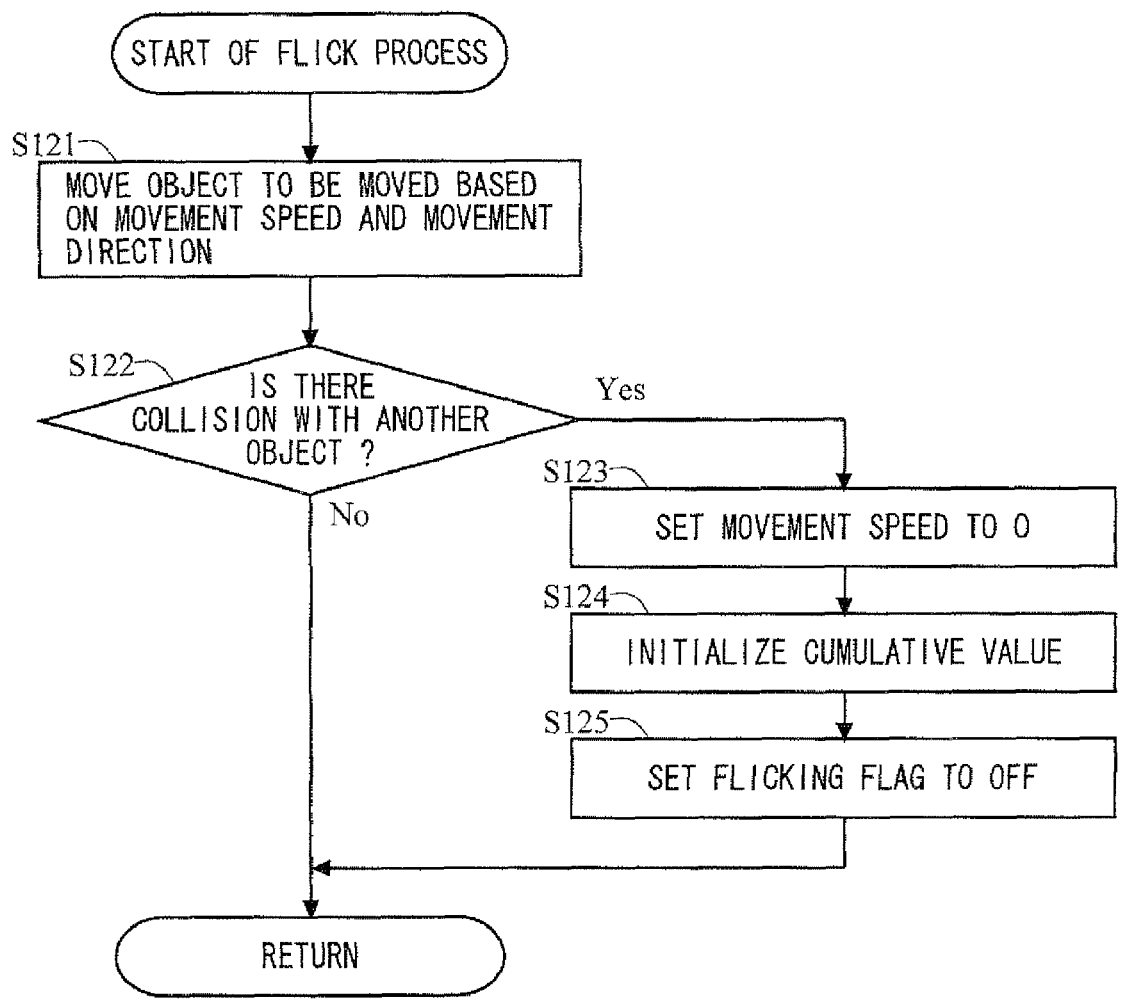
FIG. 20 is a diagram of a subroutine showing an exemplary detailed operation of a flick process performed in step 98 of FIG. 17 and step 114 of FIG. 19.
Figure 21:
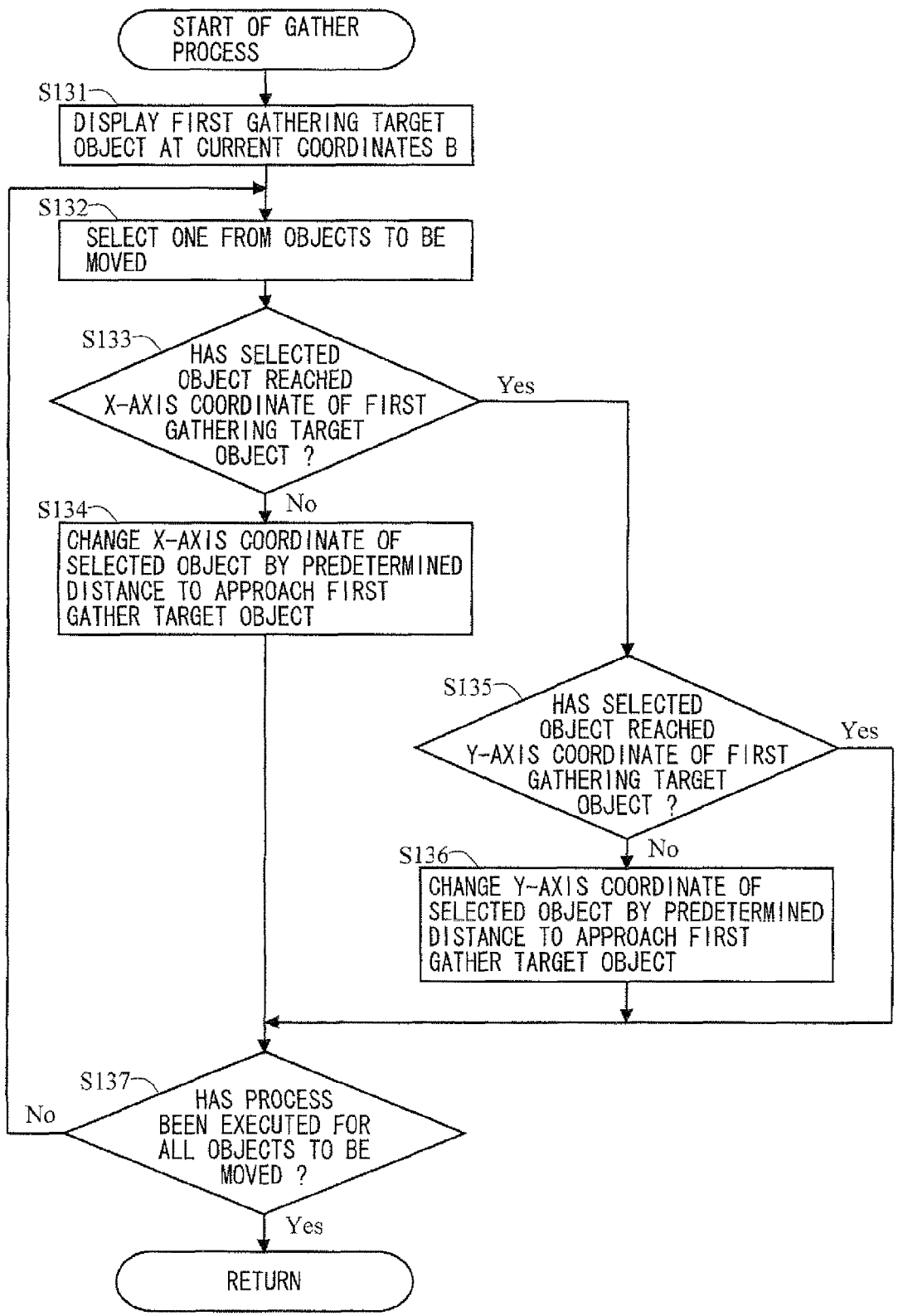
Figure 22:
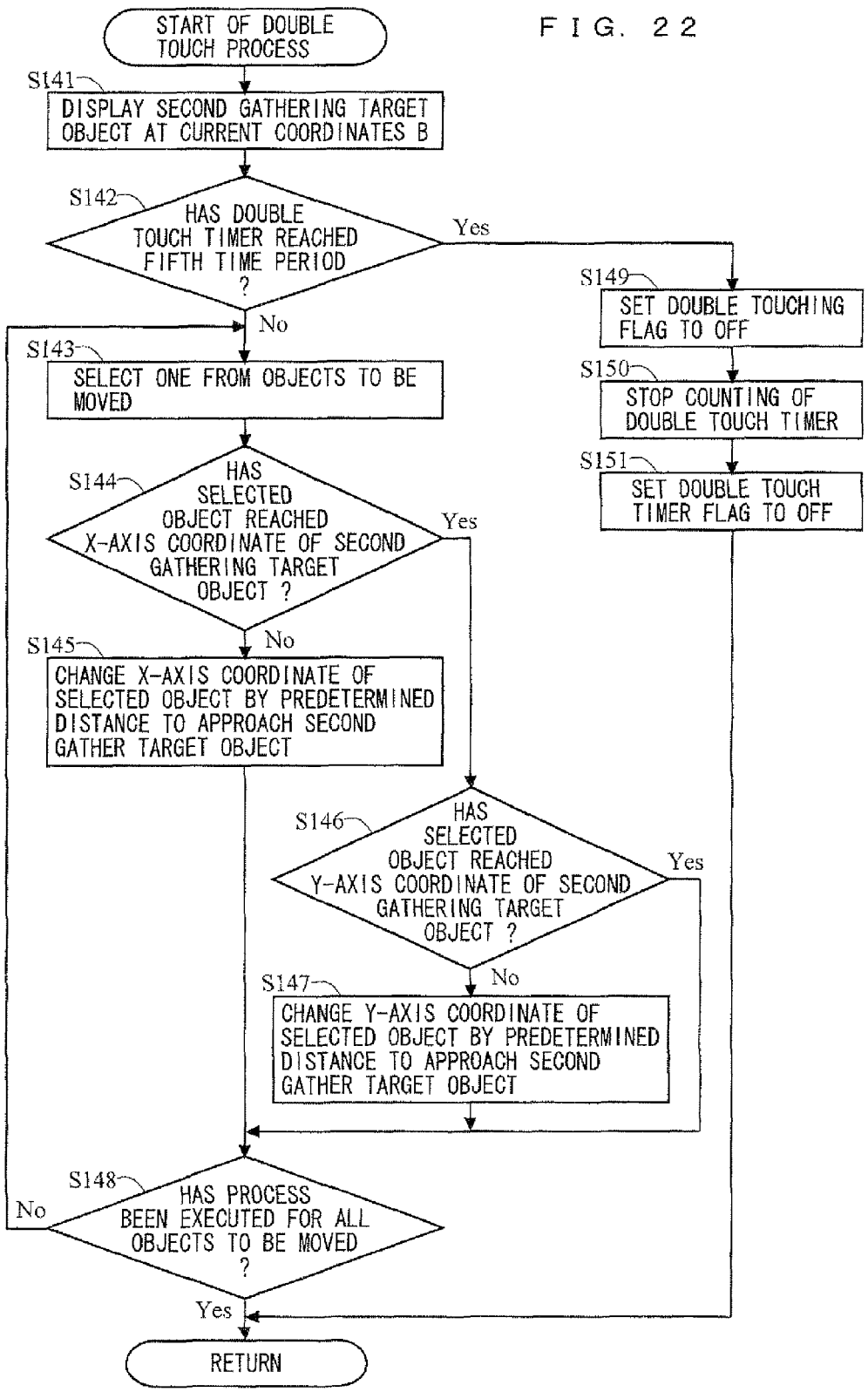
FIG. 22 is a diagram of a subroutine showing an exemplary detailed operation of a double touch process performed in step 105 of FIG. 18 and step 112 of FIG. 19.

Next, a specific process operation which is performed by a game program executed by the game apparatus 1 will be described with reference to FIGS. 14 to 22. Note that FIG. 14 is a diagram showing exemplary pieces of data which are stored in the main memory 32, depending on execution of the game program. FIG. 15 is a flowchart of a first portion showing an exemplary operation of the game apparatus 1 performing a game process by executing the game program. FIG. 16 is a flowchart of a second portion showing an exemplary operation of the game apparatus 1 performing a game process by executing the game program. FIG. 17 is a flowchart of a third portion showing an exemplary operation of the game apparatus 1 performing a game process by executing the game program. FIG. 18 is a flowchart of a fourth portion showing an exemplary operation of the game apparatus 1 performing a game process by executing the game program. FIG. 19 is a flowchart of a fifth portion showing an exemplary operation of the game apparatus 1 performing a game process by executing the game program. FIG. 20 is a subroutine showing an exemplary detailed operation of a flick process performed in step 98 of FIG. 17 and step 114 of FIG. 19. FIG. 21 is a subroutine showing an exemplary detailed operation of a gathering process performed in step 66 of FIG. 15 and the like. FIG. 22 is a subroutine showing an exemplary detailed operation of a double touch process performed in step 105 of FIG. 18 and step 112 of FIG. 19. Note that programs for executing these processes are stored in a memory (e.g., the saved data memory 34) included in the game apparatus 1, or the memory card 28 or the memory card 29. The programs, when the game apparatus 1 is powered ON, are read from the memory card 28 or the memory card 29 via the memory card I/F 36 or the memory card I/F 37, or from the built-in memory to the main memory 32, and are executed by the CPU 31.

In FIG. 14, the main memory 32 stores a program which is read out from the built-in memory, the memory card 28 or the memory card 29, and temporary data generated in an image process. In FIG. 14, the main memory 32 has a data storage area for storing operation data Da, touch start coordinates A data Db, current coordinates B data Dc, cumulative value data Dd, object-to-be-moved data De, movement speed data Df, movement direction data Dg, player object position data Dh, elapsed time value data Di, double touch timer data Dj, touch mode data Dk, touch continuation flag data Dl, flick invalidating flag data Dm, flicking flag data Dn, double touch timer flag data Do, double touching flag data Dp, image data Dq, and the like. The main memory 32 also has a program storage area for storing various programs Pa constituting the information processing program.

The operation data Da relates to an operation of the game apparatus 1 which is performed by the player. The operation data Da includes data of touch coordinates indicating a touch position in a screen coordinate system where the player touches the touch panel 13. For example, touch coordinates are obtained and stored into the operation data Da (i.e., the operation data Da is updated) at intervals of a game process cycle (e.g., 1/60 sec) of the game apparatus 1. Note that, when the player is not touching the touch panel 13, a null value (void value) is stored in the operation data Da.

The touch start coordinates A data Db stores data indicating touch coordinates indicating a touch position in the screen coordinate system where the player has started a touch operation with respect to the touch panel 13. The current coordinates B data Dc stores data indicating touch coordinates indicating a current touch position in the screen coordinate system where the player is performing a touch operation with respect to the touch panel 13. The cumulative value data Dd stores data indicating a cumulative value which is obtained by accumulating change amounts of touch positions where the player has performed a touch operation with respect to the touch panel 13 since the start of the touch operation.

The object-to-be-moved data De stores data indicating a player object PO which is selected as an object to be moved, depending on a touch operation, of the player objects PO provided in the virtual game world. The movement speed data Df stores data indicating a movement speed in the virtual game world of a player object PO which is selected as an object to be moved, depending on a touch operation. The movement direction data Dg stores data indicating a movement direction in the virtual game world of a player object PO which is selected as an object to be moved, depending on a touch operation. Note that the movement speed data Df and the movement direction data Dg may be stored in the form of a movement vector indicating a movement speed and a movement direction in the virtual game world of a player object PO. The player object position data Oh stores data indicating a position where each player object PO is provided in the virtual game world.

The elapsed time value data Di stores data indicating an elapsed time from the start of a touch operation which the player performs with respect to the touch panel 13. The double touch timer data Dj stores data indicating an elapsed time (double touch timer value) from an end-of-touch in the first tap operation when the player performs the "double touch operation."

The touch mode data Dk stores data indicating a touch mode (e.g., "flick," "gather," etc.) in which the player is performing a touch operation with respect to the touch panel 13. The touch continuation flag data Dl stores data indicating a touch continuation flag which is set to ON when the player is performing a touch operation with respect to the touch panel 13. The touch continuation flag data Dl is used to determine whether or not the player's touch operation is the first start-of-touch, or whether or not it is immediately after an end-of-touch. The flick invalidating flag data Dn stores data indicating a flick invalidating flag which is set to ON when the "flick operation" is continued during a predetermined time period or more. The flicking flag data Dn stores data indicating a flicking flag which is set to ON when the "flick operation" has been performed and a movement process is being performed, depending on the "flick operation." The double touch timer flag data Do stores data indicating a double touch timer flag which is set to ON during a time period from a start-of-touch in the first tap operation to an end-of-touch in the second tap operation, in the "double touch operation" performed by the player. The double touching flag data Dp stores data indicating a double touching flag which is set to ON when the "double touch operation" has been performed and a movement process is being performed, depending on the "double touch operation."

The image data Dg stored image data for displaying on the game apparatus 1 game images of the player objects PO, the first gathering target object TO1, the second gathering target object TO2 and the like.

Next, an operation of the game apparatus 1 will be described with reference to FIG. 15. Initially, when the game apparatus 1 is powered ON (the power button 14F is turned ON), the CPU 31 executes a boot program (not shown), so that a game program stored in the built-in memory or the memory card 28 or 29 is loaded into the main memory 32. Thereafter, the CPU 31 executes the loaded game program to execute steps shown in FIG. 15 (each step is abbreviated as "S" in FIGS. 15 to 22).

In FIG. 15, the CPU 31 initializes settings of a game process (step 51), and goes to the next step. For example, in step 51, the CPU 31 initializes parameters stored in the main memory 32 with predetermined numerical values or states. For example, the CPU 31 sets all the flags stored in the touch continuation flag data Dl, the flick invalidating flag data Dm, the flicking flag data Dn, the double touch timer flag data Do and the double touching flag data Dp to OFF. Also in step 51, the CPU 31 initializes settings of the virtual game world (e.g., settings of a virtual game space, a virtual game region, a background, a display region, arrangement of objects including the player objects PO, etc.) before displaying the virtual game world corresponding to the set display region on the lower LCD 12.

Next, the CPU 31 obtains operation data which is output by the player operating the touch panel 13 and updates the operation data Da (step 52), and goes to the next step. For example, the CPU 31 obtains touch coordinates indicating a touch position in the screen coordinate system where the player is touching the touch panel 13 and updates touch coordinates stored in the operation data Da. Note that, when the player is not touching the touch panel 13, null values are stored as the touch coordinates stored in the operation data Da.

Next, the CPU 31 determines whether or not the operation data obtained in step 52 indicates that a touch operation is being performed with respect to the touch panel 13 (step 53). For example, the CPU 31 executes the determination of step 53 by determining whether or not touch coordinates are stored in the operation data Da. Specifically, if touch coordinates are stored in the operation data Da, the CPU 31 determines that a touch operation is being performed, and if null values are stored in the operation data Da, the CPU 31 determines that a touch operation is not being performed. Thereafter, the CPU 31, when a touch operation is being performed, goes to the next step 54. On the other hand, the CPU 31, when a touch operation is not being performed, goes to the next step 90 (FIG. 17).

In step 54, the CPU 31 determines whether or not the flick invalidating flag is OFF by referring to the flick invalidating flag data Dm. Thereafter, when the flick invalidating flag is OFF, the CPU 31 goes to the next step 55. On the other hand, when the flick invalidating flag is ON, the CPU 31 goes back to the step 52 and repeats the process. In other words, the processes of step 55 and thereafter are disabled as long as the flick invalidating flag described below is ON.

In step 55, the CPU 31 sets the double touching flag indicated by the double touching flag data Dp to OFF, and goes to the next step.

Next, the CPU 31 determines whether or not the touch continuation flag is ON by referring to the touch continuation flag data Dl (step 56). Thereafter, when the touch continuation flag is ON, the CPU 31 goes to the next step 57. On the other hand, when the touch continuation flag is OFF, the CPU 31 goes to the next step 70 (FIG. 16). Note that, as will be seen from a description below, when the player first touches the touch panel 13, the touch continuation flag is OFF. Therefore, in order to first describe a case where the player first touches the touch panel 13, the processes of step 70 and thereafter will be first described (FIG. 16).

In FIG. 16, the CPU 31 determines whether or not the double touch timer flag is ON by referring to the double touch timer flag data Do (step 70). Thereafter, when the double touch timer flag is ON, the CPU 31 goes to the next step 71.

On the other hand, when the double touch timer flag is OFF, the CPU 31 goes to the next step 73. Note that, as will be seen from a description below, when the player first touches the touch panel 13, the double touch timer flag is OFF. Therefore, in order to first describe a case where the player first touches the touch panel 13, the processes of step 73 and thereafter will be first described.

In step 73, the CPU 31 sets latest touch coordinates obtained in step 52 as touch start coordinates A, and goes to the next step. For example, the CPU 31 refers to the operation data Da to set the touch start coordinates A in the virtual game world corresponding to the latest touch coordinates (typically, coordinates in the virtual game world overlapping the touch coordinates, i.e., coordinates obtained by perspective transformation of the touch coordinates into the virtual game world), and updates the touch start coordinates A data Db with the touch start coordinates A thus set.

Next, the CPU 31 determines whether or not the player is performing a touch operation on a player object PO (start-of-touch), by referring to the player object position data Dh (step 74). For example, when the touch start coordinates A set in step 73 are located on a player object PO provided in the virtual game world (e.g., the touch position TP1 in FIG. 3), the CPU 31 determines that the player starts touching the player object PO. Thereafter, when the player starts touching the player object PO, the CPU 31 goes to the next step 75. On the other hand, when the player starts touching a portion of the virtual game world other than the player objects PO (e.g., the touch position TP in FIGS. 6 and 10), the CPU 31 goes to the next step 79.

In step 75, the CPU 31 sets the touch mode to "flick" and updates the touch mode data Dk with the set touch mode, and goes to the next step. Thus, when a position where the player first starts touching is located on a player object PO, the touch mode is set to "flick."

Next, the CPU 31 sets the player object PO which it has been determined in step 74 that the player starts touching, as an object to be moved (step 76), and goes to the next step. For example, when the touch start coordinates A set in step 73 are located on any of the player objects PO provided in the virtual game world, the CPU 31 sets only the player object PO as an object to be moved, and updates the object-to-be-moved data De using data indicating the set player object PO. Thus, when the player starts touching any of the player object PO (e.g., the touch position TP1 on the player object PO2 in FIG. 3), only the player object PO (e.g., only the player object PO2 in FIG. 3) is set as an object to be moved.

Next, the CPU 31 sets the touch continuation flag to ON (step 77), and goes to the next step. For example, the CPU 31 sets the touch continuation flag to ON and updates the touch continuation flag data Dl with the set touch continuation flag, and goes to the next step. Thus, the touch continuation flag is set to ON at a time that the player first starts touching the touch panel 13.

Next, the CPU 31 initializes the elapsed time value (step 78), and goes to the next step 63 (FIG. 15). For example, the CPU 31 initializes the elapsed time value indicated by the elapsed time value data Di to 0, and updates the elapsed time value data Di with the initialized value.

On the other hand, when determining, in step 74, that the player starts touching a portion of the virtual game world other than the player objects PO, the CPU 31 sets the touch mode to "gather" and updates the touch mode data Dk with the set touch mode (step 79), and goes to the next step. Thus, when a position where the player first starts touching is a position in the virtual game world other than the player objects PO (e.g., the touch position TP in FIGS. 6 and 10), the touch mode is set to "gather."

Next, the CPU 31 sets all the player objects PO provided in the virtual game world as objects to be moved (step 80), and goes to the next step.

As a first example, the CPU 31 sets all player objects PO existing in the virtual game world as objects to be moved, and updates the object-to-be-moved data De with data indicating the set player objects PO. Note that, as described above, when the virtual game world is set as larger than a display range of the lower LCD 12, a player object PO which can be operated by the player may be located in a portion of the virtual game world outside the display range. Therefore, in the first example, a player object PO which is not displayed on the lower LCD 12 may be set as an object to be moved.

As a second example, the CPU 31 sets all player objects PO displayed on the lower LCD 12 as objects to be moved, and updates the object-to-be-moved data De using data indicating the set player objects PO. Note that, as described above, when the virtual game world is set as larger than the display range of the lower LCD 12, a player object PO which can be operated by the player may be located in a portion of the virtual game world outside the display range. However, in the second example, a player object PO which is not displayed on the lower LCD 12 is not set as an object to be moved.

As a third example, the CPU 31 sets all player objects PO which are located within a predetermined range around the touch start coordinates A in the virtual game world, as objects to be moved, and updates the object-to-be-moved data De using data indicating the set player objects PO. Note that, as described above, when the virtual game world is set as larger than the display range of the lower LCD 12, a portion of the predetermined range around the touch start coordinates A may be set outside the display range. In this case, a player object PO which can be operated by the player may be provided in the portion of the predetermined range set outside the display range. Therefore, also in the third example, as in the first example, a player object PO which is not displayed on the lower LCD 12 may be set as an object to be moved.

As a fourth example, when a plurality of player objects PO which are provided in the virtual game world are categorized into a plurality of types, only a player object (s) PO belonging to a portion of the plurality of types is set as an object to be moved. For example, in the fourth example, of the objects to be moved set in one of the first to third examples, only a player object (s) PO belonging to a portion of the types is set as an object to be moved. Note that, in the fourth example, as the type of a player object PO which is selected as an object to be moved, a specific type may be invariably selected, may be automatically selected by the CPU 31, or may be selected by the player operating the operation button 14 (e.g., the direction input button 14A, and the operation buttons 14B to 14E). Thus, when the player starts touching a portion of the virtual game world other than the player objects PO, then if there are a plurality of player objects PO in the virtual game world, a plurality of player objects PO which satisfy a predetermined condition as described in the first to fourth examples are set as objects to be moved.

Next, the CPU 31 sets the touch continuation flag to ON (step 81), and goes to the next step. For example, the CPU 31 sets the touch continuation flag to ON and updates the touch continuation flag data Dl with the set touch continuation flag, and goes to the next step. Thus, the touch continuation flag is set to ON at a time that the player first starts touching the touch panel 13.

Next, the CPU 31 initializes the elapsed time value (step 82), and goes to the next step 63 (FIG. 15). For example, the CPU 31 initializes the elapsed time value indicated by the elapsed time value data Di to 0, and updates the elapsed time value data Di with the initialized value.

Referring back to FIG. 15, when the touch continuation flag is ON in step 56, the CPU 31 increments the elapsed time value (step 57) and goes to the next step. For example, the CPU 31 adds 1 to the elapsed time value indicated by the elapsed time value data Di, and updates the elapsed time value data Di with the resultant elapsed time value. Note that, as described above, the touch continuation flag is set to ON at a time that the player first starts touching the touch panel 13 (steps 77 and 81), and therefore, the processes of step 57 and thereafter are processes during a touch operation which is continued after the player starts touching the touch panel 13.

Next, the CPU 31 determines whether or not the touch mode is "flick" by referring to the touch mode data Dk (step 58). Thereafter, when the touch mode is "flick," the CPU 31 goes to the next step 59. On the other hand, when the touch mode is not "flick" (e.g., the touch mode is "gather"), the CPU 31 goes to the next step 64.

In step 59, the CPU 31 accumulates change amounts of touch positions in a series of touch operations, and goes to the next step. Initially, the CPU 31 calculates a difference between a touch position obtained by the previous process and the latest touch position. For example, the CPU 31 calculates the difference, where the touch position obtained by the previous process is the touch start coordinates A stored in the touch start coordinates A data Db (immediately after the start of touching) or the current coordinates B stored in the current coordinates B data Dc, and the latest touch position is the touch coordinates stored in the operation data Da. Thereafter, the CPU 31 adds a difference value obtained from the difference to the cumulative value stored in the cumulative value data Dd to calculate a new cumulative value, and updates the cumulative value data Dd with the new cumulative value.

Next, the CPU 31 updates the current coordinates B with the touch coordinates obtained in step 52 (step 60), and goes to the next step. For example, the CPU 31 sets the touch coordinates stored in the operation data Da as new current coordinates B, and updates the current coordinates B data Dc with the newly set current coordinates B.

Next, the CPU 31 determines whether or not the elapsed time value indicated by the elapsed time value data Di is longer than or equal to a first time period (step 61). Thereafter, when the elapsed time value is larger than or equal to the first time period, the CPU 31 sets the flick invalidating flag to ON and updates the flick invalidating flag data Dm (step 62), and goes to the next step 63. On the other hand, when the elapsed time value is smaller than the first time period, the CPU 31 directly goes to the next step 63. Note that the first time period in step 61 is set to be a maximum time period during which it is recognized that the "flick operation" is being performed. For example, a typical drag operation with respect to the touch panel 13 and the "flick operation" provide totally different operational feelings to the player. In order to distinguish the typical drag operation from the "flick operation," the maximum time period from a start-of-touch to an end-of-touch is set as a condition for recognition of the "flick operation." Specifically, when a time period from a start-of-touch to an end-of-touch is longer than the maximum time period, it is determined that the player is performing an operation (e.g., a drag operation) other than the "flick operation" and the flick invalidating flag is set to ON. Thereafter, as will be seen from a description below, when the flick invalidating flag is set to ON, a game process corresponding to the "flick operation" is not executed.

Thus, the processes of steps 59 to 61 are repeatedly performed during a touch operation after the touch mode is set to "flick" in step 75. As a result, the change amounts of touch positions during a touch operation when the "flick operation" is being performed, are successively accumulated.

On the other hand, when determining that the touch mode is "gather" in step 58, the CPU 31 updates the current coordinates B with the touch coordinates obtained in step 52 (step 64), and goes to the next step. For example, the CPU 31 sets the touch coordinates stored in the operation data Da as new current coordinates B, and updates the current coordinates B data Dc with the newly set current coordinates B.

Next, the CPU 31 determines whether or not the elapsed time value indicated by the elapsed time value data Di is larger than or equal to a second time period (step 65). Thereafter, when the elapsed time value is larger than or equal to the second time period, the CPU 31 goes to the next step 66. On the other hand, when the elapsed time value is smaller than the second time period, the CPU 31 goes to the next step 63. Note that the second time period in step 65 is set to be a minimum time period during which it is recognized that the "continuous touch operation" is being performed. Specifically, when a touch operation is continued during the minimum time period or more after the player starts touching a portion of the virtual game world other than the player objects PO, the CPU 31 determines that the player is performing the "continuous touch operation."

In step 66, the CPU 31 executes the gathering process, and goes to the next step 63. Hereinafter, an example of the gathering process executed in step 66 will be described with reference to FIG. 21.

In FIG. 21, the CPU 31 displays on the lower LCD 12 the first gathering target object TO1 in the virtual game world which is placed at a position of the current coordinates B in the virtual game world (step 131), and goes to the next step. For example, the CPU 31 generates a game image in which an image corresponding to the first gathering target object TO1 is placed at the position of the current coordinates B stored in the current coordinates B data Dc in the virtual game world (see FIGS. 6 to 9), and displays the game image on the lower LCD 12. By this display control process with respect to the lower LCD 12, the first gathering target object TO1 is displayed at a position corresponding to the touch position TP where the player is performing the "continuous touch operation" (typically, a position in the virtual game world overlapping the player's touch position).

Next, the CPU 31 selects one of the currently set objects to be moved (step 132), and goes to the next step. As described above, in the process of step 80 (FIG. 16), player objects PO which are objects to be moved are set in the touch mode "gather," and data indicating the objects to be moved is stored in the object-to-be-moved data De. For example, in step 132, the CPU 31 selects any one player object PO from the objects to be moved indicated by the object-to-be-moved data De, as an object to be processed.

Next, the CPU 31 determines whether or not the object to be moved selected in step 132 has reached within a predetermined range which is based on the X-axis coordinate of the first gathering target object TO1 in the X-axis direction (lateral direction) of the virtual game world (step 133). For example, the CPU 31 assumes that the X-axis coordinate of the first gathering target object TO1 is the X-axis coordinate of the current coordinates B indicated by the current coordinates B data Dc, obtains the X-axis coordinate of a player object PO which is the object to be moved selected in step 132 from the player object position data Dh, and compares these X-axis coordinates, thereby executing the determination of step 133. Thereafter, when the object to be moved selected in step 132 has not reached within the predetermined range which is based on the X-axis coordinate of the first gathering target object TO1, the CPU 31 goes to the next step 134. On the other hand, when the object to be moved selected in step 132 has reached within the predetermined range which is based on the X-axis coordinate of the first gathering target object TO1, the CPU 31 goes to the next step 135.

In step 134, the CPU 31 moves the object to be moved selected in step 132 by a predetermined distance in the virtual game world, in an X-axis direction of the virtual game world in which the object to be moved approaches the first gathering target object TO1, displays the resultant object to be moved on the lower LCD 12, and goes to the next step 137. For example, the CPU 31 refers to the player object position data Dh, and adds a predetermined value to the X-axis coordinate of a player object PO which is the object to be moved selected in step 132, or subtracts a predetermined value from the X-axis coordinate, thereby calculating a new X-axis coordinate which allows the object to be moved to approach the first gathering target object TO1. Thereafter, the CPU 31 updates the player object position data Dh corresponding to the player object PO which is the object to be moved selected in step 132, with the newly calculated X-axis coordinate, and moves the player object PO to a position in the virtual game world corresponding to the new X-axis coordinate before displaying the player object PO.

On the other hand, in step 135, the CPU 31 determines whether or not the object to be moved selected in step 132 has reached within a predetermined range which is based on a Y-axis coordinate of the first gathering target object TO1 in a Y-axis direction (vertical direction) of the virtual game world. For example, the CPU 31 assumes that the Y-axis coordinate of the first gathering target object TO1 is the Y-axis coordinate of the current coordinates B indicated by the current coordinates B data Dc, obtains a Y-axis coordinate of a player object PO which is the object to be moved selected in step 132 from the player object position data Dh, and compares these Y-axis coordinates, thereby executing the determination of step 135. Thereafter, when the object to be moved selected in step 132 has not reached within the predetermined range which is based on the Y-axis coordinate of the first gathering target object TO1, the CPU 31 goes to the next step 136. On the other hand, when the object to be moved selected in step 132 has reached within the predetermined range which is based on the Y-axis coordinate of the first gathering target object TO1, the CPU 31 goes to the next step 137.

In step 136, the CPU 31 moves the object to be moved selected in step 132 by a predetermined distance in the virtual game world, in a Y-axis direction of the virtual game world in which the object to be moved approaches the first gathering target object TO1, displays the resultant object to be moved on the lower LCD 12, and goes to the next step 137. For example, the CPU 31 refers to the player object position data Dh, and adds a predetermined value to the Y-axis coordinate of a player object PO which is the object to be moved selected in step 132, or subtracts a predetermined value from the Y-axis coordinate, thereby calculating a new Y-axis coordinate which allows the object to be moved to approach the first gathering target object TO1. Thereafter, the CPU 31 updates the player object position data Oh corresponding to the player object PO which is the object to be moved selected in step 132, with the newly calculated Y-axis coordinate, and moves the player object PO to a position in the virtual game world corresponding to the new Y-axis coordinate before displaying the player object PO.

Figure 8:
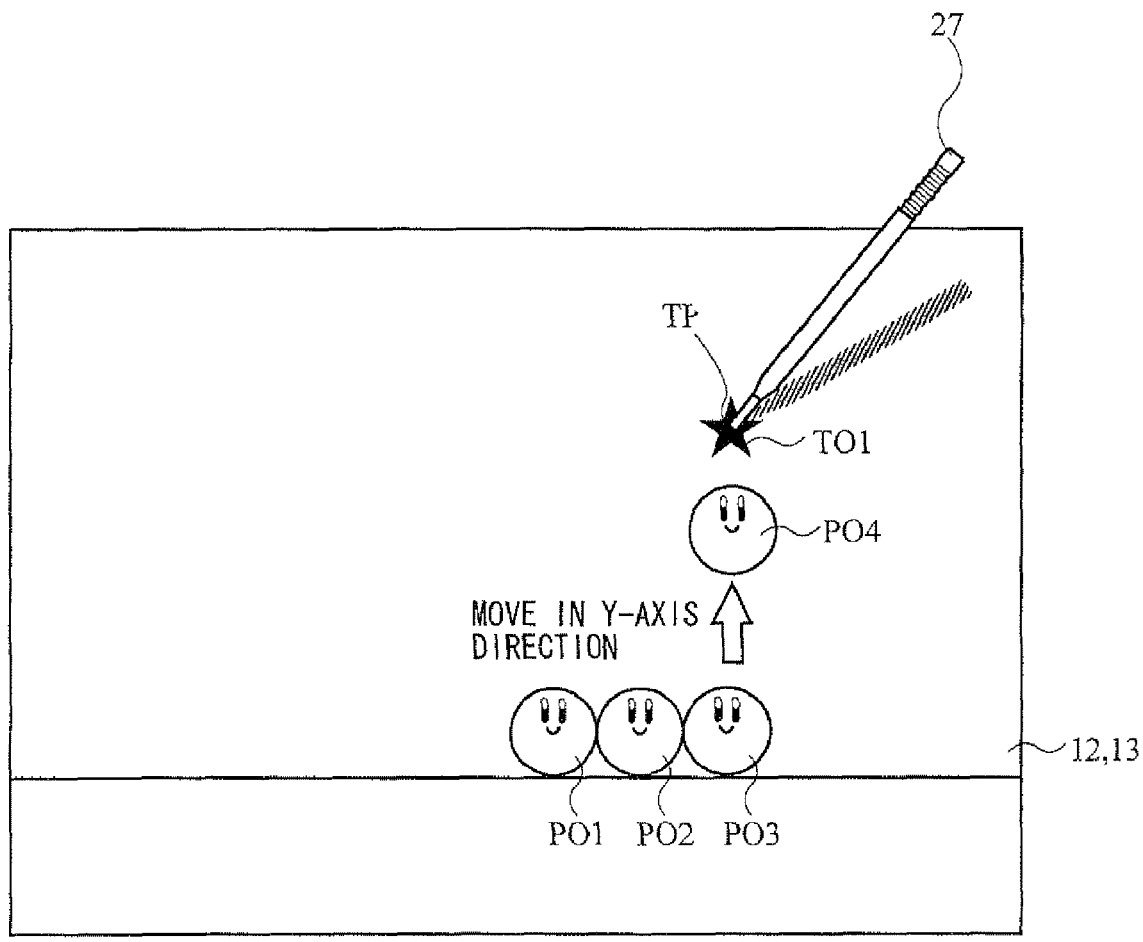
FIG. 8 is a diagram showing an exemplary game image displayed on the lower LCD 12 when a plurality of operation objects are selected as objects to be moved by performing a "continuous touch operation" via the touch panel 13.
Figure 9:
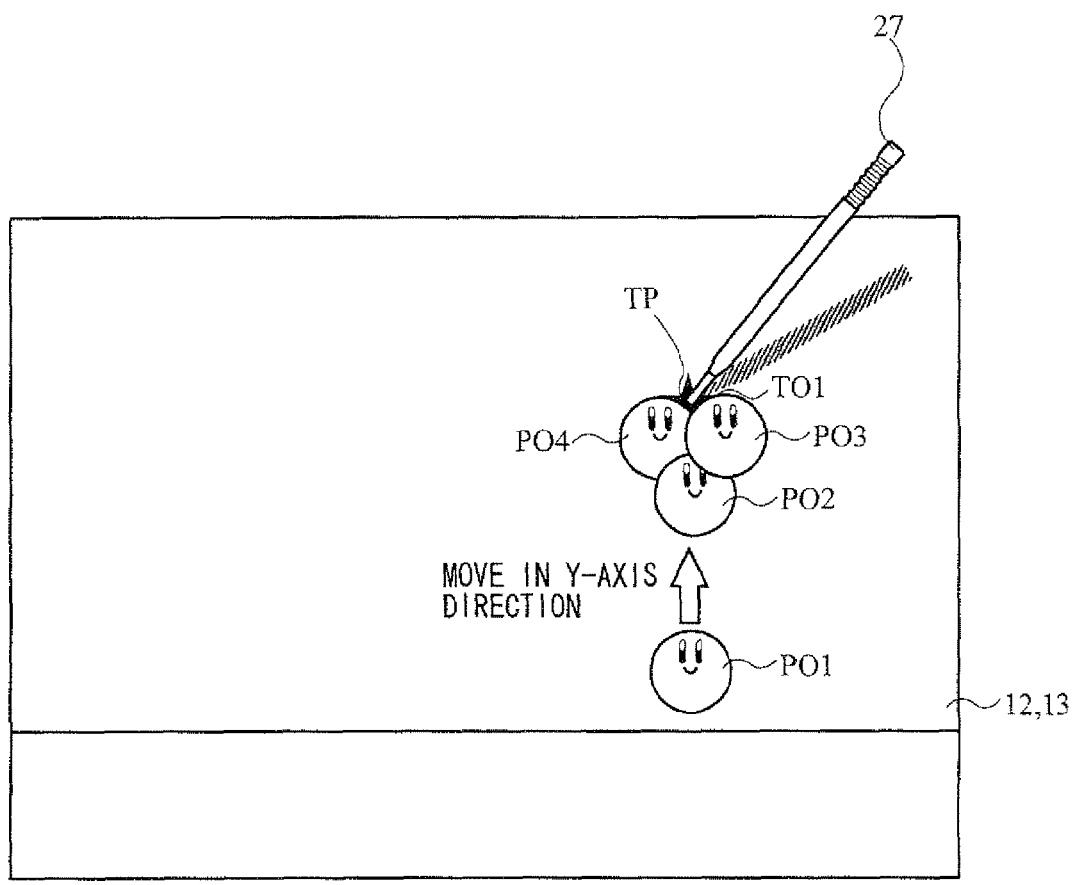
FIG. 9 is a diagram showing an exemplary game image displayed on the lower LCD 12 when a plurality of operation objects are selected as objects to be moved by performing a "continuous touch operation" via the touch panel 13.

Thus, when the processes of steps 132 to 136 are repeatedly executed, a player object PO which is an object to be moved is moved in the X-axis direction and thereafter in the Y-axis direction to approach the first gathering target object TO1 (see FIGS. 7 to 9). Note that, when the player ends the "continuous touch operation" and ends touching the touch panel 13, the first gathering target object TO1 disappears from the virtual game world, and the movement control of moving a player object PO toward the first gathering target object TO1 is ended. The subsequent movement control of a player object PO may be executed, depending on an environment set in the virtual game world (e.g., a player object PO which has reached the first gathering target object TO1 may be caused to perform a downward free fall in the virtual game world), may be moved by an automatic control by the CPU 31, or may be caused to remain stopped without a movement. Note that the process of the movement control after the player ends the "continuous touch operation" and ends touching the touch panel 13, will not be described in detail.

In step 137, the CPU 31 determines whether or not the processes of steps 132 to 136 have been completed for all currently set objects to be moved. Thereafter, when there remains an object to be moved for which the processes of steps 132 to 136 have not been executed, the CPU 31 goes back to step 132 and repeats the process. On the other hand, when the processes of steps 132 to 136 have been executed for all currently set objects to be moved, the CPU 31 ends the process of the subroutine.

Referring back to FIG. 15, a process which is executed when the player is not touching the touch panel 13 will be described. When the player is not touching the touch panel 13, i.e., the result of the determination in step 53 is negative, the CPU 31 goes to the next step 90 (FIG. 17).

In FIG. 17, the CPU 31 determines whether or not the touch continuation flag is ON by referring to the touch continuation flag data Dl (step 90). Thereafter, when the touch continuation flag is ON, the CPU 31 goes to the next step 91. On the other hand, when the touch continuation flag is OFF, the CPU 31 goes to the next step 111 (FIG. 19).

In step 91, the CPU 31 sets the touch continuation flag to OFF and updates the touch continuation flag data Dl, and goes to a process following step 91. Here, the touch continuation flag is set to ON at a time that the player starts touching the touch panel 13 (steps 77 and 81) and is invariably kept ON during a time period that the touch operation continues to be performed. If the touch continuation flag is ON when the player is not touching the touch panel 13 (Yes in step 90), the touch continuation flag is set to OFF in step 91 and processes following step 91 are executed. In other words, the touch continuation flag is changed from ON to OFF only at a time that the player ends touching the touch panel 13, and processes following step 91 are also executed only at a time that the player ends touching the touch panel 13. Hereinafter, processes (processes following step 91) which are performed at a time that the player ends touching the touch panel 13 will be described.

After the process of step 91, the CPU 31 determines whether or not the flick invalidating flag is ON by referring to the flick invalidating flag data Dm (step 92). Thereafter, when the flick invalidating flag is OFF, the CPU 31 goes to the next step 93. On the other hand, when the flick invalidating flag is ON, the CPU 31 changes the flick invalidating flag to OFF and updates the flick invalidating flag data Dm (step 99), and goes to the next step 63 (FIG. 15).

In step 93, the CPU 31 determines whether or not the touch mode is "flick" by referring to the touch mode data Bk. Thereafter, when the touch mode is "flick," the CPU 31 goes to the next step 94. On the other hand, when the touch mode is "gather," the CPU 31 goes to the next step 101 (FIG. 18).

In step 94, the CPU 31 determines whether or not a distance between the touch start coordinates A and the current coordinates B is larger than or equal to a threshold value. Thereafter, when the distance between the touch start coordinates A and the current coordinates B is larger than or equal to the threshold value, the CPU 31 goes to the next step 95. On the other hand, when the distance between the touch start coordinates A and the current coordinates B is smaller than the threshold value, the CPU 31 goes to the next step 63 (FIG. 15). Note that the threshold value used in step 94 is a value for determining whether or not the player has performed the "flick operation." Therefore, when the distance between the start-of-touch position and the end-of-touch position is smaller than the threshold value, the player has not performed the "flick operation." In other words, when the player performs the "flick operation," a touch operation needs to be performed by a distance which is larger than or equal to the threshold value, and a time period from a start-of-touch to an end-of-touch needs to be smaller than the first time period used in step 61. These criterion values may be decided, taking the operability of the game apparatus 1 into consideration. Thereafter, the CPU 31 calculates the aforementioned distance using the touch start coordinates A indicated by the touch start coordinates A data Db and the current coordinates B indicated by the current coordinates B data Dc, and compares the distance with the threshold value, thereby executing the determination of step 94.

In step 95, the CPU 31 sets the flicking flag to ON and updates the flicking flag data Dn, and goes to the next step. Thus, the flicking flag is set to ON at a time that it is determined that the player has performed the "flick operation."

Next, the CPU 31 uses the cumulative value indicated by the cumulative value data Dd to calculate an average value of change amounts of touch positions in a series of "flick operations" and decides a movement speed, depending on the average value (step 96), and goes to the next step. For example, the CPU 31 divides the cumulative value indicated by the cumulative value data Dd by the elapsed time value (the number of elapsed frames) indicated by the elapsed time value data Di to calculate an average value of change amounts of touch positions in the "flick operation." Thereafter, as an example, a movement speed corresponding to the calculated average value is extracted from a predetermined data table to decide the movement speed, and the movement speed data Df is updated with the decided movement speed.

For example, referring to FIG. 23, the data table used in step 96 describes movement speeds corresponding to average values of change amounts. Specifically, when the average value of change amounts is 1 to 2 dots, the movement speed is set to 9.10 dots/frame. Also, when the average value of change amounts is 3 to 5 dots, the movement speed is set to 11.80 dots/frame. Moreover, when the average value of change amounts is 6 dots or more, the movement speed is set to 14.95 dots/frame.

Next, the CPU 31 sets a direction from the touch start coordinates A toward the current coordinates B as a movement direction (step 97), and goes to the next step. For example, the CPU 31 sets the movement direction using the touch start coordinates A indicated by the touch start coordinates A data Pb and the current coordinates B indicated by the current coordinates B data Dc, and updates the movement direction data Dg with the set movement direction. Note that the format of the movement direction data stored in the movement direction data Dg may be a directional vector having a length of 1 indicating the movement direction in the virtual game world, or may be a movement vector having a length corresponding to the movement speed and indicating the movement direction.

Next, the CPU 31 executes a flick process (step 98), and goes to the next step 63 (FIG. 15). Hereinafter, the flick process executed in step 98 will be described with reference to FIG. 20.

In FIG. 20, the CPU 31 sets a movement speed and a movement direction of an object to be moved by the "flick operation," moves the object to be moved in the virtual game world based on the movement speed and the movement direction, and displays the resultant object to be moved on the lower LCD 12 (step 121), and goes to the next step. For example, the CPU 31, when the flick process is performed immediately after an end-of-touch, moves the object to be moved by the "flick operation" by directly using the movement speed indicated by the movement speed data Df and the movement direction indicated by the movement direction data Dg. Also, when the flick process is performed one or more frames after an end-of-touch, the CPU 31 changes the movement speed indicated by the movement speed data Di and the movement direction indicated by the movement direction data Dg, depending on an environment set in the virtual game world, such as a free fall due to a gravitational acceleration or the like, and updates the movement speed data Df and the movement direction data Dg with the changed movement speed and movement direction, and in addition, moves the object to be moved by the "flick operation" using the changed movement speed and movement direction. Thereafter, the CPU 31 updates the player object position data Dh with a position after the movement of a player object PO which is the object to be moved.

Next, the CPU 31 determines whether or not the player object PO which is the object to be moved has collided with another object (another character, a wall, a ceiling, a ground, etc.) in the virtual game world (step 122). Thereafter, when the player object PO which is the object to be moved has collided with another object, the CPU 31 goes to the next step 123. On the other hand, when the player object PO which is the object to be moved has not collided with any other objects, the CPU 31 ends the process of the subroutine.

In step 123, the CPU 31 sets a movement speed at which the player object PO which is the object to be moved moves in the virtual game world to 0, and goes to the next step. For example, the CPU 31 sets the movement speed indicated by the movement speed data Df to 0 and updates the movement speed data Df. Thus, the movement of the player object PO which is the object to be moved depending on the "flick operation" is ended. Note that, after execution of this step, the movement speed and the movement direction of the player object PO which is the object to be moved are decided, taking into consideration an environment (a gravitational acceleration, etc.) set in the virtual game world, or are decided, depending on a property (repelling, halting movement, etc.) of another object with which the player object PO collides, or are automatically decided based on thinking of the CPU 31, for example. These movement controls will not be described in detail.

Next, the CPU 31 initializes the cumulative value of change amounts of touch positions (step 124), and goes to the next step. For example, the CPU 31 initializes the cumulative value stored in the cumulative value data Dd to 0 and updates the cumulative value data Dd with the initialized value.

Next, the CPU 31 sets the flicking flag to OFF and updates the flicking flag data Dn (step 125), and ends the process of the subroutine. Thus, the flicking flag is set to ON at a time that the player starts the "flick operation" and is set to OFF at a time that a movement based on the "flick operation" of the object to be moved by the "flick operation" is ended.

Referring back to FIG. 17, when determining that the touch mode is "gather" in step 93, the CPU 31 goes to the next step 101 (FIG. 18).

In FIG. 18, the CPU 31 determines whether or not the double touch timer flag is ON by referring to the double touch timer flag data Do (step 101). Thereafter, when the double touch timer flag is ON, the CPU 31 goes to the next step 102. On the other hand, when the double touch timer flag is OFF, the CPU 31 goes to the next step 108. Note that, as will be seen from a description below, the double touch timer flag, which is initially OFF, is set to ON when the player has performed a tap operation within a third time period. Hereinafter, a process which is executed when the double touch timer flag is in the initial state (i.e., OFF; No in step 101) will be described first.

In step 108, the CPU 31 determines whether or not the elapsed time value indicated by the elapsed time value data Di is within the third time period. Thereafter, when the elapsed time value is within the third time period, the CPU 31 goes to the next step 109. On the other hand, when the elapsed time value is longer than the third time period, the CPU 31 goes to the next step 63 (FIG. 15).

In step 109, the CPU 31 starts counting a double touch timer. For example, the CPU 31 initializes the double touch timer value indicated by the double touch timer data Dj to 0 and updates the double touch timer data Dj before starting counting the double touch timer value.

Next, the CPU 31 sets the double touch timer flag to ON and updates the double touch timer flag data Do (step 110), and goes to the next step 63 (FIG. 15).

Note that the third time period in step 108 is used so as to determine a touch operation time period during which the first tap operation has been performed in the "double touch operation," and is set to be a maximum time period during which it is recognized that the first tap operation is being performed. Specifically, when a touch operation continues to be performed with respect to the touch panel 13 during a time period which is longer than the third time period, the touch operation is not recognized as the first tap operation of the "double touch operation." when a touch operation is recognized as the first tap operation, the double touch timer starts counting and the double touch timer flag is set to ON.

Here, as described above, when a touch operation continues to be performed during the second time period or longer, the touch operation is recognized as the "continuous touch operation." Therefore, the third time period used in the determination of step 108 is set to be the same as or shorter than the second time period used in the determination of step 65.

Next, a case where the second tap operation of the "double touch operation" is performed will be described with reference to FIGS. 15 and 16.

When the player starts touching the touch panel 13 in the second tap operation, the touch continuation flag is OFF since step 91 (FIG. 17) is executed at a time that the player ends touching in the first tap operation. Therefore, at a time that the player starts touching in the second tap operation, the result of step 56 (FIG. 15) is negative (No). Thereafter, the CPU 31 determines that the double touch timer flag is ON in step 70 (FIG. 16), and goes to the next step 71.

In step 71, the CPU 31 updates the current coordinates B with the touch coordinate obtained in step 52, and goes to the next step 72. For example, the CPU 31 sets the touch coordinates stored in the operation data Da as new current coordinates B, and updates the current coordinates B data Dc with the newly set current coordinates B. Thus, in step 71, a touch position in the second tap operation is obtained as the current coordinates B.

Next, the CPU 31 sets the touch continuation flag to ON (step 72), and goes to the next step 63 (FIG. 15). For example, the CPU 31 sets the touch continuation flag to ON, and updates the touch continuation flag data Dl with the set touch continuation flag. Thus, the touch continuation flag is also set to ON at a time that the player starts touching the touch panel 13 in the second tap operation.

Next, a process of ending touching in the second tap operation of the "double touch operation" will be described. When the player ends touching the touch panel 13 in the second tap operation, the touch mode is maintained as "gather" which was set upon the first tap operation (step 79 (FIG. 16)), and the touch continuation flag is ON (step 72 (FIG. 16)). Therefore, the result of the determination in step 90 (FIG. 17) becomes positive and the result of the determination in step 93 (FIG. 17) becomes negative, and therefore, the process of the step 101 (FIG. 18) is executed. Hereinafter, processes of step 101 and thereafter will be described with reference to FIG. 18.

In FIG. 18, the CPU 31 determines whether or not the double touch timer flag is ON by referring to the double touch timer flag data Do (step 101). Here, as described about the process of step 110, the double touch timer flag is ON, corresponding to the end-of-touch in the first tap operation of the "double touch operation." Therefore, at a time that the player ends touching in the second tap operation of the "double touch operation," the double touch timer flag is ON, and therefore, the CPU 31 goes to the next step 102.

In step 102, the CPU 31 determines whether or not the double touch timer value is within a fourth time period by referring to the double touch timer value indicated by the double touch timer data Dj. Thereafter, when the double touch timer value is within the fourth time period, the CPU 31 goes to the next step 103. On the other hand, when the double touch timer value is longer than the fourth time period, the CPU 31 goes to the next step 106. Here, as described above, the double touch timer value is obtained by starting counting upon an end-of-touch in the first tap operation of the "double touch operation" (step 109) and ending counting upon an end-of-touch in the second tap operation. The fourth time period used in the determination process of step 102 is used so as to determine a time period from an end-of-touch in the first tap operation of the "double touch operation" to an end-of-touch in the second tap operation, and is set to be a maximum time period during which it is recognized that the "double touch operation" is being performed. Specifically, when a time period from an end-of-touch in the first tap operation to an end-of-touch in the second tap operation is longer than the fourth time period (e.g., the second tap operation is performed after a long time has elapsed since the end of the first tap operation, etc.), the first and second touch operations are not recognized as the "double touch operation."

In step 103, the CPU 31 calculates a distance between the touch start coordinates and the current coordinates B, and determines whether or not the distance is within a threshold value. Thereafter, when the distance between the touch start coordinates A and the current coordinates B is within the threshold value, the CPU 31 goes to the next step 104. On the other hand, when the distance between the touch start coordinates A and the current coordinates B is longer than the threshold value, the CPU 31 goes to the next step 106. For example, in step 103, the CPU 31 calculates the distance between the touch start coordinates A and the current coordinates B in the virtual game world, using the touch start coordinates A indicated by the touch start coordinates A data Db and the current coordinates B indicated by the current coordinates B data Cc. Thereafter, the CPU 31 determines whether or not the distance between the touch start coordinates A and the current coordinates B is longer than a predetermined threshold value. Here, in the "double touch operation," the player performs a tap operation twice with respect to a position in the virtual game world where the player desires to gather the player objects PO, i.e., a touch operation is performed twice at the same position in the virtual game world (the touch position TP in FIG. 10). Therefore, when there is a large difference (distance) between a position where the first tap operation is performed and another position where the second tap operation is performed, these positions are recognized as being different from each other, i.e., the first and second tap operations are not recognized as the "double touch operation." However, it is rare for the player to perform a tap operation twice at exactly the same position on the touch panel 13, and therefore, it is necessary to assume that there is a certain error. According to such a background, in step 103, in order to determine whether or not the two tap operations are performed within a certain distance (i.e., within the threshold value), a distance between a position where the first tap operation is performed (the touch start coordinates A) and a position where the second tap operation is performed (the current coordinates B) is used for the determination. The threshold value used in step 103 is set as an upper limit value of a distance indicating a range within which the error is accepted.

In step 104, the CPU 31 sets the double touching flag to ON and updates the double touching flag data Dp, and goes to the next step 105. Thus, when it is recognized that the player has performed the "double touch operation," the double touching flag is set to ON.

Next, the CPU 31 executes the double touch process (step 105), and goes to step 63 (FIG. 15). Hereinafter, an example of the double touch process executed in step 105 will be described with reference to FIG. 22.

In FIG. 22, the CPU 31 places the second gathering target object TO2 in the virtual game world at a position of the current coordinates B in the virtual game world and displays the second gathering target object TO2 on the lower LCD 12 (step 141), and goes to the next step. For example, the CPU 31 generates a game image by placing an image corresponding to the second gathering target object TO2 at a position of the current coordinates B stored in the current coordinates B data Dc in the virtual game world (see FIGS. 10 to 13), and displays the game image on the lower LCD 12. By this display control process with respect to the lower LCD 12, the second gathering target object TO2 is displayed at a position depending on the touch position TP where the player has performed the "double touch operation" (typically, a position in the virtual game world which overlaps the player's touch position).

Next, the CPU 31 determines whether or not the double touch timer value has reached a predetermined time period, by referring to the double touch timer value indicated by the double touch timer data Dj (step 142). Thereafter, when the double touch timer value has not reached a fifth time period, the CPU 31 goes to the next step 143. On the other hand, when the double touch timer value has reached the fifth time period, the CPU 31 goes to the next step 149. Here, as described above, the double touch timer value is obtained by starting counting upon an end-of-touch in the first tap operation of the "double touch operation" (step 109), i.e., counting from the end-of-touch until the current time. The fifth time period used in the determination process of step 142 is used so as to set a limit time period within which the second gathering target object TO2 is caused to appear in the virtual game world, depending on the "double touch operation," i.e. limit time period within which the player objects PO are moved, depending on the "double touch operation." The limit time period is set so that the movement process is effectively executed, depending on the "double touch operation." Specifically, when a time period from the end-of-touch in the first tap operation of the "double touch operation" to the current time has reached the fifth time period, the movement process of the player objects PO depending on the "double touch operation" is ended.

In step 143, the CPU 31 selects one of the currently set objects to be moved, and goes to the next step. As described above, in the process of step 80 (FIG. 16), player objects PO which are objects to be moved are set in the touch mode "gather" and data indicating the objects to be moved is stored in the object-to-be-moved data De. For example, in step 143, the CPU 31 selects one player object PO of the objects to be moved indicated by the object-to-be-moved data De as one to be processed.

Next, the CPU 31 determines whether or not the object to be moved selected in step 143 has reached within a predetermined range which is based on the X-axis coordinate of the second gathering target object TO2 in the X-axis direction (lateral direction) of the virtual game world (step 144). For example, the CPU 31 assumes that the X-axis coordinate of the second gathering target object TO2 is the X-axis coordinate of the current coordinates B indicated by the current coordinates B data Dc, obtains the X-axis coordinate of a position where a player object PO which is the object to be moved selected in step 143 from the player object position data Dh, and compares these X-axis coordinates, thereby executing the determination of step 144. Thereafter, when the object to be moved selected in step 143 has not reached within the predetermined range which is based on the X-axis coordinate of the second gathering target object TO2, the CPU 31 goes to the next step 145. On the other hand, when the object to be moved selected in step 143 has reached within the predetermined range which is based on the X-axis coordinate of the second gathering target object TO2, the CPU 31 goes to the next step 146.

In step 145, the CPU 31 causes the object to be moved selected in step 143 to move by a predetermined distance in the virtual game world in a direction which allows the object to be moved to approach the second gathering target object TO2 in the X-axis direction of the virtual game world, displays the object to be moved on the lower LCD 12, and goes to the next step 148. For example, the CPU 31 refers to the player object position data Dh, and adds a predetermined value to the X-axis coordinate of a position where the player object PO which is the object to be moved selected in step 143 is placed, or subtracts a predetermined value from the X-axis coordinate, thereby calculating a new X-axis coordinate which allows the object to be moved to approach the second gathering target object TO2. Thereafter, the CPU 31 updates the player object position data Dh corresponding to the player object PO which is the object to be moved selected in step 143 with the newly calculated X-axis coordinate, moves the player object PO to a position in the virtual game world corresponding to the new X-axis coordinate, and displays the player object PO.

On the other hand, in step 146, the CPU 31 determines whether or not the object to be moved selected in step 143 has reached within a predetermined range which is based on the Y-axis coordinate of the second gathering target object TO2 in the Y-axis direction (vertical direction) of the virtual game world. For example, the CPU 31 assumes that the Y-axis coordinate of the second gathering target object TO2 is the Y-axis coordinate of the current coordinates B indicated by the current coordinates B data Dc, obtains the Y-axis coordinate of a position where the player object PO which is the object to be moved selected in step 143 is located from the player object position data Oh, and compares these Y-axis coordinates, thereby executing the determination of step 146. Thereafter, when the object to be moved selected in step 143 has not reached within the predetermined range which is based on the Y-axis coordinate of the second gathering target object TO2, the CPU 31 goes to the next step 147. On the other hand, when the object to be moved selected in step 143 has reached within the predetermined range which is based on the Y-axis coordinate of the second gathering target object TO2, the CPU 31 goes to the next step 148.

In step 147, the CPU 31 moves the object to be moved selected in step 143 by a predetermined distance in the virtual game world in a direction which allows the object to be moved to approach the second gathering target object TO2 in the Y-axis direction of the virtual game world, and displays the resultant object to be moved on the lower LCD 12, and goes to the next step 148. For example, the CPU 31 refers to the player object position data Dh, and adds a predetermined value to the Y-axis coordinate of a position where the player object PO which is the object to be moved selected in step 143 is placed, or subtracts a predetermined value from the Y-axis coordinate, thereby calculating a new Y-axis coordinate which causes the object to be moved to approach the second gathering target object TO2. Thereafter, the CPU 31 updates the player object position data Dh corresponding to the player object PO which is the object to be moved selected in step 143 with the newly calculated Y-axis coordinate, moves the player object PO to a position in the virtual game world corresponding to the new Y-axis coordinate, and displays the resultant player object PO.

Figure 12:
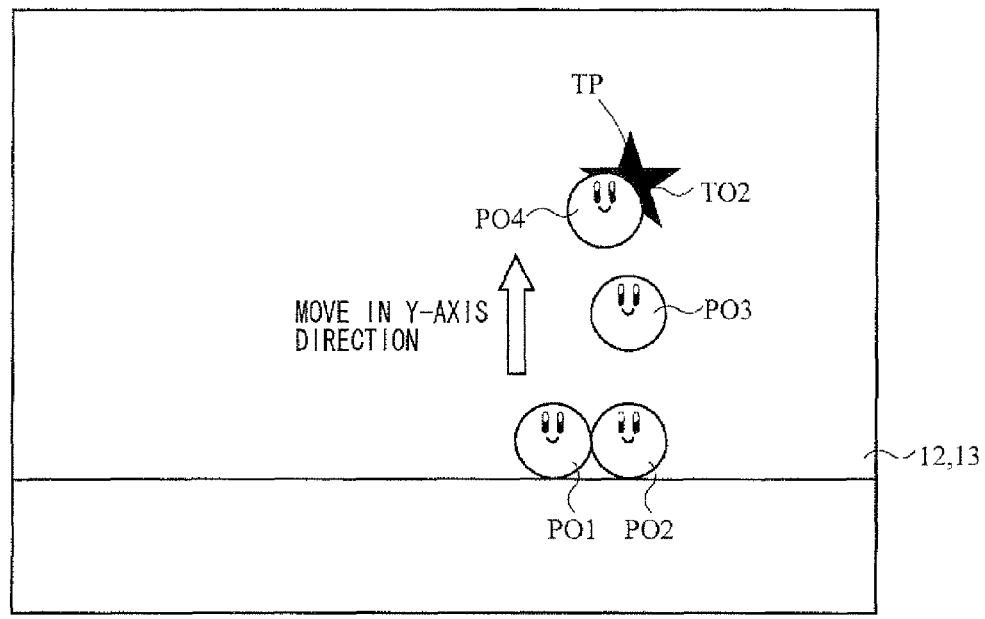
FIG. 12 is a diagram showing an exemplary game image displayed on the lower LCD 12 when a plurality of operation objects are selected as objects to be moved by performing a "double touch operation" via the touch panel 13.
Figure 13:
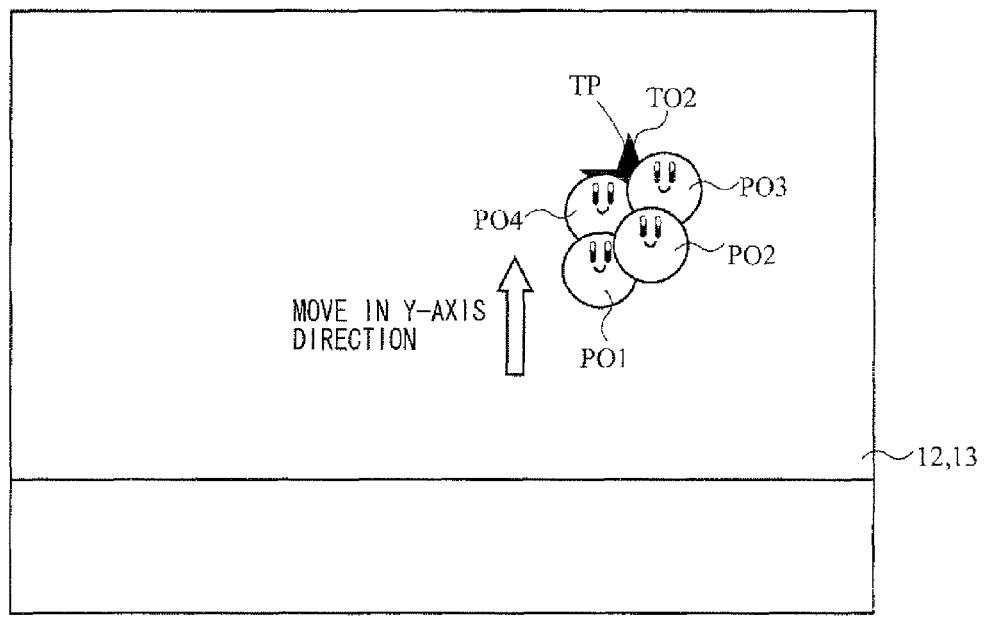
FIG. 13 is a diagram showing an exemplary game image displayed on the lower LCD 12 when a plurality of operation objects are selected as objects to be moved by performing a "double touch operation" via the touch panel 13.

Thus, when the processes of steps 143 to 147 are repeatedly executed, a player object PO which is an object to be moved is moved in the X-axis direction and thereafter in the Y-axis direction so that the player object PO approaches the second gathering target object TO2 (see FIGS. 11 to 13). Note that, when the double touch timer value has reached the fifth time period, the second gathering target object TO2 disappears from the virtual game world, and the control of the movement toward the second gathering target object TO2 is also ended. The following movement control of the player objects PO may be executed, depending on an environment set in the virtual game world (e.g., the player objects PO which have reached the second gathering target object TO2 may be caused to perform a downward free fall in the virtual game world), or may be moved by an automatic control by the CPU 31. Note that a process indicating the movement control after the second gathering target object TO2 disappears will not be described in detail.

In step 148, the CPU 31 determines whether or not the processes of steps 143 to 147 have been completed for all the currently set objects to be moved. Thereafter, when there remains an object to be moved for which the processes of steps 143 to 147 have not been completed, the CPU 31 goes back to step 143 and repeats the process. On the other hand, when the processes of steps 143 to 147 have been completed for all the currently set objects to be moved, the CPU 31 ends the process of the subroutine.

On the other hand, when determining that the double touch timer value has reached the fifth time period in step 142, the CPU 31 sets the double touching flag to OFF and updates the double touching flag data Dp (step 149). Next, the CPU 31 stops counting of the double touch timer and also stops updating the double touch timer data Dj (step 150). Thereafter, the CPU 31 sets the double touch timer flag to OFF and updates the double touch timer flag data Do (step 151), and ends the process of the subroutine. Thus, when the movement control of the player objects PO corresponding to the "double touch operation" is ended, the double touching flag is set to OFF.

Referring back to FIG. 18, when the double touch timer value is longer than the fourth time period (No in step 102), or when the distance between the touch start coordinates A and the current coordinates B is longer than the threshold value (No in step 103), the CPU 31 goes to the next step 106. Specifically, when the player performs a tap operation twice with respect to the touch panel 13, then if these touch operations are not recognized as the "double touch operation," the processes corresponding to the "double touch operation" which have been so far executed are cancelled by processes of step 106 and thereafter. Specifically, the CPU 31 stops counting of the double touch timer and also stops updating the double touch timer data Dj (step 106). Thereafter, the CPU 31 sets the double touch timer flag to OFF and updates the double touch timer flag data Do (step 107), and goes to the next step 63 (FIG. 15).

Next, a process which is executed in a case where the player is not touching the touch panel 13 after processes (processes following step 91 (FIG. 17)) are executed at a time that the player ends touching the touch panel 13, will be described. When the player is not touching the touch panel 13, in step 53 (FIG. 15) the CPU 31 goes to the next step 90 (FIG. 17). Thereafter, as described above, the touch continuation flag has been OFF since the end-of-touch, and therefore, in step 90 the CPU 31 goes to the next step 111 (FIG. 19).

In FIG. 19, the CPU 31 determines whether or not the double touching flag indicated by the double touching flag data Dp is ON (step 111). Thereafter, when the double touching flag is ON, the CPU 31 goes to the next step 112. On the other hand, when the double touching flag is OFF, the CPU 31 goes to the next step 113.

In step 112, the CPU 31 executes the double touch process and goes to the next step 113. Note that the double touch process executed in step 112 is similar to the process of step 105 described above with reference to FIG. 22 and will not be described in detail.

In step 113, the CPU 31 determines whether or not the flicking flag indicated by the flicking flag data Dn is ON. Thereafter, when the flicking flag is ON, the CPU 31 goes to the next step 114. On the other hand, when the flicking flag is OFF, the CPU 31 goes to the next step 63 (FIG. 15).

In step 114, the CPU 31 executes a flick process and goes to the next step 63 (FIG. 15). Note that the flick process executed in step 114 is similar to the process of step 98 described above with reference to FIG. 20 and will not be described in detail.

Next, a process which is executed when a touch operation is temporarily recognized as the "flick operation," and thereafter, the recognition is invalidated by the following touch operation, will be described. For example, as described above, when a time period from a start-of-touch to an end-of-touch does not satisfy a condition under which a touch operation can be recognized as the "flick operation," i.e., the time period is longer than the predetermined maximum time period of the "flick operation," it is determined that the player is performing an operation other than the "flick operation," and the flick invalidating flag is set to ON (step 62 (FIG. 15)). In such a case, even when the player is performing a touch operation with respect to the touch panel 13, the result of the determination in step 54 (FIG. 15) is negative, so that the processes of steps 52 to 54 are repeated, and therefore, in this embodiment, the movement process with respect to a player object PO is not executed.

On the other hand, when the player ends touching the touch panel 13 while the flick invalidating flag is ON, the CPU 31 provides the negative result of the determination in step 53, and provides the positive result of the determination in step 90 (FIG. 17) since the touch continuation flag is ON. Thereafter, the CPU 31 provides the positive result of the determination in step 92 since the flick invalidating flag is ON, and goes to the next step 99.

In step 99, the CPU 31 sets the flick invalidating flag to OFF and updates the flick invalidating flag data Dm, and goes to the next step 63 (FIG. 15). Thus, when a touch operation is temporarily recognized as the "flick operation" and thereafter the recognition is cancelled by the following touch operation, the movement process with respect to a player object PO is not executed. Thereafter, the flick invalidating flag is initialized (OFF) by the player ending touching the touch panel 13, and the movement process with respect to a player object PO is returned to the initial state.

Referring back to FIG. 15, in step 63, the CPU 31 determines whether or not to end the game process. The game process is ended under, for example, a condition that at least one player object PO has reached a predetermined position (a finish line, etc.) in the virtual game world to survive in a current game stage of the game process, a condition that at least one player object contacts an enemy object, so that the game is over, a condition that the player performs an operation of ending the game process, or the like. When not ending the game process, the CPU 31 goes to the next step 67. On the other hand, when ending the game process, the CPU 31 ends the process of the flowchart.

In step 67, the CPU 31 determines whether or not the double touch timer flag is ON by referring to the double touch timer flag data Do. Thereafter, when the double touch timer flag is ON, the CPU 31 goes to the next step 68. On the other hand, when the double touch timer flag is OFF, the CPU 31 goes back to step 52 and repeats the process.

In step 68, the CPU 31 increments the double touch timer value, and goes back to step 52 and repeats the process. For example, the CPU 31 adds 1 to the double touch timer value indicated by the double touch timer data Dj, and updates the double touch timer data Dj with the resultant double touch timer value. Note that, as described above, the double touch timer flag is set to ON, corresponding to an end-of-touch in the first tap operation of the "double touch operation," and the double touch timer flag is maintained in the ON state until the end of the double touch process or until it is determined that the "double touch operation" is invalid. Therefore, the process of step 68 is executed during the "double touch operation" which is continued after an end-of-touch in the first tap operation of the "double touch operation" or during the double touch process which is executed, depending on the "double touch operation." In other words, the double touch timer value is updated at intervals of a unit time during a time period that the double touch timer flag is ON.

Thus, in the game apparatus 1 of this embodiment, when input coordinates at which the player starts touching the touch panel 13 indicate any of the player objects PO, only the player object PO is set as an object to be operated. On the other hand, in the game apparatus 1, when the input coordinates at which the player starts touching the touch panel 13 indicate none of the player objects PO, a plurality of player objects PO are set as objects to be operated. Therefore, the game apparatus 1 can select a player object(s) PO as an object to be operated by a simple touch input operation.

Note that, in the description above, a player object PO which is set as an object to be moved by a "flick operation" starts a movement corresponding to the "flick operation" after the player ends touching in the "flick operation." Alternatively, a player object PO as an object to be moved may start a movement with another timing. For example, at a time that an object to be moved corresponding to a "flick operation" is set, the object to be moved may be successively moved to a position in the virtual game world corresponding to a player's touch position. In this case, the player object PO set as an object to be moved is moved to a position in the virtual game world corresponding to a touch position in the "flick operation." Note that the player object PO set as an object to be moved may be moved based on a movement speed and a movement direction set in the "flick operation" even after an end-of-touch in the "flick operation" (steps 96 and 97), or may be moved only during a touch operation in the "flick operation," but not after the end-of-touch.

Also, in the description above, a "flick operation" is recognized under a temporal condition that a time period from a start-of-touch to an end-of-touch on a player object PO is shorter than the first time period, and if the temporal condition is not satisfied, a movement process corresponding to the "flick operation" is not executed. Alternatively, the movement process may be executed irrespective of the time period from a start-of-touch to an end-of-touch. Specifically, even if the time period from a start-of-touch to an end-of-touch is longer than or equal to a predetermined time period, the "flick operation" may be recognized, and the player object PO as an object to be moved may be moved, depending on the "flick operation." Also, the "flick operation" is recognized under a distance condition that a distance between a start-of-touch and an end-of-touch on a player object PO (i.e., the distance between the touch start coordinates A and the current coordinates B) is larger than or equal to a threshold value, and if the distance condition is not satisfied, a movement process corresponding to the "flick operation" is not executed. Alternatively, the movement process may be executed irrespective of the distance between a start-of-touch and an end-of-touch. Moreover, the distance condition may take other values for recognition of the "flick operation." For example, the "flick operation" may be recognized under a distance condition that a cumulative value of change amounts of touch positions in the "flick operation" is larger than or equal to a threshold value.

Also, in the description above, a movement speed of an object to be moved corresponding to a "flick operation" is set, depending on an average value of change amounts of touch positions in the "flick operation." Alternatively, the movement speed may be set, depending on other values. For example, a movement speed of an object to be moved corresponding to the "flick operation" may be set, depending on a distance between a start-of-touch and an end-of-touch on a player object PO (i.e., the distance between the touch start coordinates A and the current coordinates B). Also, in the description above, as an example, a movement speed of an object to be moved corresponding to the "flick operation" is set using a data table as shown in FIG. 23. Alternatively, a movement speed of an object to be moved corresponding to the "flick operation" may be calculated by substituting the average value of change amounts of touch positions and/or the distance between the touch start coordinates A and the current coordinates B into a predetermined calculation expression.

Also, in the description above, as an example, a movement speed and a movement direction of an object to be moved in the virtual game world, depending on a "flick operation," are changed, depending on an environment set in the virtual game world, after the start of a movement depending on the "flick operation." Alternatively, an object to be moved may be moved at a movement speed and in a movement direction which are fixed to those which are set during the start of a movement. In this case, an object to be moved in the virtual game world, depending on a "flick operation," may be moved using a movement speed and a movement direction which are set during the start of a movement until it contacts or collides with another object (another character, a wall, a ceiling, a ground, etc.) provided in the virtual game world. Also, an object to be moved set by a "flick operation" may be moved to a position in the virtual game world corresponding to an end-of-touch position in the "flick operation," depending on a movement speed and a movement direction which are set during the start of a movement.

Also, in the description above, in order for a touch operation to be recognized as the "continuous touch operation," the touch operation needs to be continued during a predetermined time period or longer. The present invention is not limited to such a process. For example, at a time that the player starts touching a position in the virtual game world other than the player objects PO, it may be recognized that the "continuous touch operation" is performed, and an object to be moved may start moving toward the start-of-touch position in the virtual game world.

Also, the "continuous touch operation" or the "double touch operation" is recognized under a condition that input coordinates where the player starts touching the touch panel 13 indicate none of the player objects PO. Therefore, even if the start-of-touch input coordinates indicate another object (another character (an enemy object, a background object (a stone, a tree, etc.), etc.), a wall, a ceiling, a ground, etc.) provided in the virtual game world, the condition for the recognition of the "continuous touch operation" or the "double touch operation" is satisfied. However, when the start-of-touch input coordinates indicate another object provided in the virtual game world, the touched operation may not be recognized as the "continuous touch operation" or the "double touch operation" (i.e., the condition for the recognition of the "continuous touch operation" or the "double touch operation" may not be satisfied). Also, even when the start-of-touch input coordinates indicate a region other than the virtual game world displayed on the lower LCD 12, the touched operation may be validated as the "continuous touch operation" or the "double touch operation" (i.e., the condition for the recognition of the "continuous touch operation" or the "double touch operation" may be satisfied). In this case, even if a position indicated by the start-of-touch input coordinates is a region other than the virtual game world, then when, for example, a portion of the virtual game world is displayed on the lower LCD 12, a position in the virtual game world (typically, a position in the virtual game world which is not displayed on the lower LCD 12) corresponding to the position indicated by the input coordinates, can be calculated. Therefore, if the calculated position in the virtual game world is set as a target for the gathering process, a similar movement control can be executed with respect to a player object PO.

Also, in the description above, when a touch position is moved during the "continuous touch operation," the display position of the first gathering target object TO1 is also moved, depending on the movement of the touch position, and therefore, a destination for an object to be moved is also changed. However, as an example, the display position of the first gathering target object TO1 may be fixed to a position in the virtual game world which first appears, depending on the "continuous touch operation." In this case, even when a touch position is moved during the "continuous touch operation," a destination for an object to be moved is fixed to a touch position as it is at a time that the "continuous touch operation" is determined to be valid or a position in the virtual game world corresponding to a position where the player touches in the "continuous touch operation." Also, as another example, when a touch position is moved, during the "continuous touch operation," to a position exceeding a predetermined range which is based on a display position where the first gathering target object TO1 first appears, the "continuous touch operation" may be caused to be invalid.

Also, in the description above, the double touch process expected in steps 105 and 112 is continued until the double touch timer value reaches a predetermined time period. However, if another touch operation is performed during the continuation, the double touch process is also ended. However, during the continuation of the double touch process, even when another touch operation is performed, the touch operation may be caused to be invalid and the double touch process may be continued with priority.

Also, in the description above, touch operations are recognized as the "double touch operation" under a temporal condition that a time period (double touch timer value) from an end-of-touch in the first tap operation to an end-of-touch in the second tap operation is within the fourth time period. Alternatively, other time periods may be used as the temporal condition for the recognition of the "double touch operation." As a first example, touch operations are recognized as the "double touch operation" under a temporal condition that a time period from a start-of-touch in the first tap operation to an end-of-touch in the second tap operation is within the fourth time period. As a second example, touch operations are recognized as the "double touch operation" under a temporal condition that a time period from a start-of-touch in the first tap operation to a start-of-touch in the second tap operation is within the fourth time period. As a third example, touch operations are recognized as the "double touch operation" under a temporal condition that a time period from an end-of-touch in the first tap operation to a start-of-touch in the second tap operation is within the fourth time period.

Also, in the description above, a position in the virtual game world indicated by the end-of-touch position of the second tap operation in the "double touch operation" is a destination for an object to be moved. Alternatively, other positions may be a destination. For example, in the "double touch operation," a position in the virtual game world indicated by any one of the start-of-touch position of the first tap operation, the end-of-touch position of the first tap operation, and the start-of-touch position of the second tap operation, may be a destination for an object to be moved. Alternatively, a position in the virtual game world indicated by a position (intermediate point) which is obtained by averaging the start-of-touch position or the end-of-touch position of the first tap operation and the start-of-touch position or the end-of-touch position of the second tap operation, may be a destination for an object to be moved. Also, the "double touch operation" is an operation which is established by performing a tap operation twice within a predetermined time period at a position where the player desires to gather all player objects PO. The condition for this establishment is not limited to performing a tap operation twice. For example, the "double touch operation" may be established under a condition that a tap operation is performed three or more times within a predetermined time period at a position where the player desires to gather all player objects PO (a so-called "triple touch operation" or more).

Also, in the description above, as an example, a player object PO which is selected, depending on a player's touch operation, is moved. Alternatively, the player object PO which is selected, depending on a player's touch operation, may perform other motions. As a first example, when input coordinates where the player starts touching the touch panel 13 indicate any of the player objects PO, the designated player object PO moves another object in a direction toward a touch position in the subsequent slide operation or in a predetermined direction. On the other hand, when input coordinates where the player starts touching the touch panel 13 indicate none of the player objects PO, all the player objects PO each move another object in a direction toward the touch position. For example, this is applicable to various games, e.g., a game in which the designated player object PO fires an object, such as a bullet, a light beam or the like, in the aforementioned direction, a game in which the designated player object PO throws, kicks, hits, projects or the like an object, such as a ball or the like, in the aforementioned direction (a ball game), and the like. As a second example, when input coordinates where the player starts touching the touch panel 13 indicate any of the player objects PO, a direction in which the designated player object PO faces (e.g., a front direction) is changed to a direction toward a touch position in the subsequent slide operation or in a predetermined direction. On the other hand, when input coordinates where the player starts touching the touch panel 13 indicate none of the player objects PO, directions in which all the player objects PO face are changed to a direction toward the touch position or in a predetermined direction. As a third example, input coordinates where the player starts touching the touch panel 13 indicate any of the player objects PO, a displayed form (e.g., a color (a hue, a brightness, a saturation), a size, a pattern, highlighted/non-highlighted, displayed/non-displayed, etc.) of the designated player object PO is changed. On the other hand, when input coordinates where the player starts touching the touch panel 13 indicate none of the player objects 20, the displayed forms of all the player objects PO are changed.

Also, in the embodiments above, an object (the first gathering target object TO1 or the second gathering target object TO2) is displayed at a position of a destination of an object to be moved, depending on the "continuous touch operation" or the "double touch operation." As a result, the player can accurately find out the position of the destination which is currently set, depending on the touch operation. However, if such an effect is not expected, an object does not have to be displayed at the position of the destination of an object to be moved.

Also, in the embodiment above, as an example of liquid crystal display units corresponding to two screens, the lower LCD 12 and the upper LCD 22, which are physically separated from each other, are vertically arranged (upper and lower screens (two screens)). However, the two display screens may be arranged or constructed in other manners. For example, the lower LCD 12 and the upper LCD 22 may be horizontally arranged on one main surface of the lower housing 11. Alternatively, an LCD which is taller than it is wide, specifically, having the same width as that of the lower LCD 12 and a height twice as large as that of the lower LCD 12 (i.e., a physically single LCD having a display size corresponding to two screens) is provided on one main surface of the lower housing 11, and two images (e.g., a captured image and an operation explaining screen, etc.) may be vertically displayed (i.e., the two images are vertically adjacent to each other without a boundary space therebetween). Alternatively, an LCD which is wider than it is tail, specifically, having the same height as that of the lower LCD 12 and a width twice as large as that of the lower LCD 12, may be provided on one main surface of the lower housing 11, and two images may be laterally arranged (i.e., the two images are laterally adjacent to each other without a boundary space therebetween). In other words, a physically single screen may be divided into two, on which two images are displayed. In any image form, when a physically single screen is divided into two, on which two images are displayed, the touch panel 13 may be provided on the entire screen.

Also, in the example above, the touch panel 13 is integrated with the game apparatus 1. The present invention can be achieved even if the game apparatus and the touch panel are separated from each other. Moreover, the touch panel 13 may be provided on an upper surface of the upper LCD 22, and a display image which is displayed on the lower LCD 12 as described above may be displayed on the upper LCD 22. Also, in the example above, two display screens (the lower LCD 12 and the upper LCD 22) are provided. Alternatively, only a single display screen may be provided. Specifically, in the example above, the upper LCD 22 may not be provided, and only the lower LCD 12 may be provided as a display screen and the touch panel 13 is provided on the lower LCD 12. Also, in the example above, the lower LCD 12 may not be provided, the touch panel 13 may be provided on an upper surface of the upper LCD 22, and a display image which is displayed on the lower LCD 12 as described above may be displayed on the upper LCD 22.

Also, in the example above, the touch panel 13 is used as an input means of the game apparatus 1 for inputting coordinates. Alternatively, other pointing devices may be used. Here, the pointing device is an input device for designating an input position or coordinates on a screen. For example, a mouse, a trackpad, a trackball, a graphics tablet, a joystick or the like is used as the input means, and an information about a position in a screen coordinate system calculated from an output value output from the input means is used, thereby making it possible to similarly achieve the present invention. Note that, when the input means is a pointing device, such as a mouse or the like, a touched state and a non-touched state may be caused to correspond to ON and OFF of a click button, and a process of calculating coordinates from an output value output from the mouse or the like may be executed in an information processing apparatus or the like.

Also, when a stationary game apparatus is employed in which a game is enjoyed by the player holding a game controller, a pointing device in another form may be contemplated. For example, a camera fixed to a housing of the game controller can be used as the pointing device. In this case, an image captured by the camera is changed, depending on a change in a position pointed by the housing of the game controller. Therefore, by analyzing the captured image, coordinates pointed by the housing with respect to a display screen can be calculated.

In this case, if the coordinates indicating the position pointed by the housing are assumed as touch coordinates in the aforementioned process, it is possible to achieve the present invention. Note that, the presence or absence of an input to a touch panel (e.g., a start-of-touch, an end-of-touch, etc.) is replaced with the presence or absence of or a change in another input from the game controller which is different from that in the aforementioned coordinate input operation. As a first example, a start-of-touch or an end-of-touch is determined, depending on whether or not an operation button provided in the game controller is pressed down (e.g., when an A-button is pressed down, a start-of-touch is determined). As a second example, the game controller includes two housings. One of the two housings has the camera, and the other has a detection unit, such as an acceleration sensor or the like, which outputs a signal depending on a motion of the other housing. The detection unit is fixed to the other housing. In this case, a start-of-touch or an end-of-touch is determined, depending on a motion of the other housing (e.g., a start-of-touch is determined when the housing is inclined in a predetermined direction). As a third example, a voice inputting means, such as a microphone or the like, is provided in the housing of the game controller. In this case, a start-of-touch and an end-of-touch are switched when the player utters a predetermined voice.

Also, in the example above, the handheld game apparatus 1 and the stationary game apparatus are described. Alternatively, an information processing apparatus, such as a typical personal computer or the like, may be used to execute the information processing program of the present invention, thereby achieving the present invention.

Also, the shape of the game apparatus 1, and the shapes, number, positions and the like of the operation buttons 14 and the touch panel 13 are only for illustrative purposes. Even if other shapes, number and positions are employed, the present invention can be achieved. Also, the process sequence, set values, values for determination and the like used in the game process are only for illustrative purposes. Even if other process sequence, set values, values for determination and the like are employed, the present invention can be achieved.

The storage medium storing the information processing program of the present invention and the information processing apparatus of the present invention can select an object to be operated by a simple input operation, and therefore, are useful for an information processing apparatus, such as a game apparatus which displays a plurality of objects, and the like, and are useful as an information processing program, such as a game program which is executed by the information processing apparatus, or the like.

While the invention has been described in detail, the foregoing description is in all aspects illustrative and not restrictive. It is to be understood that numerous other modifications and variations can be devised without departing from the scope of the invention. It is also to be understood that the scope of the invention is indicated by the appended claims rather than by the foregoing description. It is also to be understood that the detailed description herein enables one skilled in the art to make changes coming within the meaning and equivalency range of the present invention. It is also to be understood that all of the patents, patent applications and publications recited herein are hereby incorporated by reference as if set forth in their entirety herein.

It should be understood throughout the present specification that expression of a singular form includes the concept of their plurality unless otherwise mentioned. Specifically, articles or adjectives for a singular form (e.g., "a," "an," "the," etc. in English) include the concept of their plurality unless otherwise mentioned. It should be also understood that the terms as used herein have definitions typically used in the art unless otherwise mentioned. Thus, unless otherwise defined, all scientific and technical terms have the same meanings as those generally used by those skilled in the art to which the present invention pertain. If there is contradiction, the present specification (including the definitions) precedes.

What is claimed is:

1. A non-transitory computer readable storage medium storing an information processing program executable by a computer of an apparatus for selecting at least one object, depending on an output from a pointing device, the information processing program causes the computer to provide functionality comprising:
    display control for displaying on a display device at least a portion of a virtual world in which a plurality of objects are provided;
    coordinate detection for detecting input coordinates input by the pointing device; and
    object selection for, when the input coordinates indicate any of the plurality of objects, selecting the indicated object as a target to be operated, and when the input coordinates indicate none of the plurality of objects, selecting at least one object satisfying a predetermined condition of the plurality of objects as a target to be operated.

2. The non-transitory computer readable storage medium according to claim 1, wherein
    the object selection selects the object satisfying the predetermined condition as a target to be operated when the input coordinates indicate a position in the virtual world displayed on the display device and the input coordinates indicate none of the plurality of objects.

3. The non-transitory computer readable storage medium according to claim 2, wherein
    the plurality of objects are each movable object which can be moved in the virtual world, and
    the information processing program causes the computer to provide further functionality comprising:
        object motion control for causing the object which the object selection has selected as a target to be operated to perform a predetermined motion.

4. The non-transitory computer readable storage medium according to claim 3, wherein
    the movable object can be moved in the virtual world, depending on an output from the pointing device; and
    the object motion control moves the object which the object selection has selected as a target to be operated in the virtual world, depending on an output from the pointing device.

5. The non-transitory computer readable storage medium according to claim 4, wherein
    the object motion control includes:
        first movement for, when the object indicated by the input coordinates is selected as a target to be operated by the object selection, moving the object in a direction depending on a change in the input coordinates; and
        second movement for, when the object satisfying the predetermined condition is selected as a target to be operated by the object selection, moving the object toward a position which is based on the input coordinates.

6. The non-transitory computer readable storage medium according to claim 5, wherein
    the information processing program causes the computer to provide further functionality comprising:
        time movement for measuring a time period from the start to the end of inputting using the pointing device, and
    the first movement, when the time period measured by the time measurement is within a first time period, moves the object which the object selection has selected as a target to be operated.

7. The non-transitory computer readable storage medium according to claim 5, wherein
    the information processing program causes the computer to provide further functionality comprising:

parameter calculation for calculating a parameter relating to a change in input coordinates using any of the input coordinates detected between the start and the end of inputting using the pointing device, and the first movement, when the parameter satisfies a predetermined condition, moves the object which the object selection has selected as a target to be operated.

8. The non-transitory computer readable storage medium according to claim 7, wherein the parameter calculation calculates as the parameter a distance between a position indicated by the input coordinates detected during the start of inputting using the pointing device and a position indicated by the input coordinates detected during the end of inputting using the pointing device, and the first movement, when the distance is larger than or equal to a predetermined value, moves the object which the object selection has selected as a target to be operated.

9. The non-transitory computer readable storage medium according to claim 5, wherein the information processing program causes the computer to provide further functionality comprising:

parameter calculation for calculating a parameter relating to a change in input coordinates using any of the input coordinates detected between the start and the end of inputting using the pointing device; and movement speed decision for deciding a movement speed of the object which the object selection has selected as a target to be operated, based on the parameter, and the first movement moves the object which the object selection has selected as a target to be operated, based on the movement speed decided by the movement speed decision.

10. The non-transitory computer readable storage medium according to claim 9, wherein the parameter calculation includes:

change amount calculation for repeatedly calculating a change amount between input coordinates detected in a current process by the coordinate detection and input coordinates detected in a previous process by the coordinate detector; and average value calculation for calculating as the parameter an average value of the change amounts repeatedly calculated by the change amount calculation from the start to the end of inputting using the pointing device, and the movement speed decision decides a movement speed of the object which the object selection has selected as a target to be operated, based on the average value.

11. The non-transitory computer readable storage medium according to claim 5, wherein the information processing program causes the computer to provide further functionality comprising:

time measurement for measuring a time period during which inputting using the pointing device has been continued since the start thereof, and the second movement, when the time period measured by the time measurement is larger than or equal to a second time period, moves the object satisfying the predetermined condition toward the position which is based on the input coordinates.

12. The non-transitory computer readable storage medium according to claim 11, wherein the information processing program causes the computer to provide further functionality comprising:

input determination for determining whether or not inputting using the pointing device is ended within a third time period after the object selection selects the object satisfying the predetermined condition as a target to be operated, and inputting using the pointing device is intermittently performed at least once within a fourth time period, and the second movement, when the time period measured by the time measurement is larger than or equal to the second time period, moves the object satisfying the predetermined condition toward the position which is based on the input coordinates, at a first movement speed, and the second movement, when the determination by the input determination is positive, moves the object satisfying the predetermined condition toward the position which is based on the input coordinates, at a second movement speed different from the first movement speed.

13. The non-transitory computer readable storage medium according to claim 11, wherein the information processing program causes the computer to provide further functionality comprising:

input determination for determining whether or not inputting using the pointing device is ended within a third time period after the object selection selects the object satisfying the predetermined condition as a target to be operated, and inputting using the pointing device is intermittently performed at least once within a fourth time period, and the second movement, when the determination by the input determination is positive, moves the object satisfying the predetermined condition toward the position based on the input coordinates only within a fifth time period.

14. The non-transitory computer readable storage medium according to claim 1, wherein the object selection, when the input coordinates indicate none of the plurality of objects, selects all objects provided in the virtual world as a target to be operated.

15. The non-transitory computer readable storage medium according to claim 1, wherein the object selection, when the input coordinates indicate none of the plurality of objects, selects at least one object displayed on the display device as a target to be operated.

16. The non-transitory computer readable storage medium according to claim 1, wherein the object selection, when the input coordinates indicate none of the plurality of objects, selects as a target to be operated at least one object located within a predetermined range which is based on a position in the virtual world indicated by the input coordinates.

17. An information processing apparatus for selecting at least one object, depending on an output from a pointing device, comprising:

a display controller for displaying on a display device at least a portion of a virtual world in which a plurality of objects are provided;

a coordinate detector for detecting input coordinates input by the pointing device; and an object selector for, when the input coordinates indicate any of the plurality of objects, selecting the indicated object as a target to be operated, and when the input coordinates indicate none of the plurality of objects, selecting at least one object satisfying a predetermined condition of the plurality of objects as a target to be operated.

* * * * *